United States Patent
Yu et al.

(10) Patent No.: US 9,892,499 B2
(45) Date of Patent: Feb. 13, 2018

(54) OBJECTIVE ASSESSMENT METHOD FOR STEREOSCOPIC IMAGE QUALITY COMBINED WITH MANIFOLD CHARACTERISTICS AND BINOCULAR CHARACTERISTICS

(71) Applicant: Ningbo University, Ningbo, Zhejiang (CN)

(72) Inventors: Mei Yu, Zhejiang (CN); Zhaoyun Wang, Zhejiang (CN); Fen Chen, Zhejiang (CN); Meiling He, Zhejiang (CN)

(73) Assignee: Ningbo University, Ningbo, Zhejiang (CN)

( * ) Notice: Subject to any disclaimer, the term of this patent is extended or adjusted under 35 U.S.C. 154(b) by 0 days.

(21) Appl. No.: 15/233,950

(22) Filed: Aug. 11, 2016

(65) Prior Publication Data

US 2016/0350941 A1    Dec. 1, 2016

(30) Foreign Application Priority Data

Jun. 6, 2016   (CN) .......................... 2016 1 0397239

(51) Int. Cl.
*G06K 9/00* (2006.01)
*G06T 7/00* (2017.01)
(Continued)

(52) U.S. Cl.
CPC .......... *G06T 7/0002* (2013.01); *G06K 9/4661* (2013.01); *G06K 9/6252* (2013.01);
(Continued)

(58) Field of Classification Search
USPC .................................................... 1/1; 348/51
See application file for complete search history.

(56) References Cited

U.S. PATENT DOCUMENTS 9,094,665 B2 *   7/2015   Jiang ...................... G06T 1/0028
9,189,893 B2 *  11/2015   Tsubaki ............. H04N 13/0022
(Continued)

OTHER PUBLICATIONS

Chen, M., et al., "Full-reference quality assessment of stereopairs accounting for rivalry," Signal Processing: Image Communication (SPIC), vol. 28, pp. 1143-1155, Jun. 2013.*
(Continued)

*Primary Examiner* — Xuemei Chen

(57) ABSTRACT

An objective assessment method for a stereoscopic image quality combined with manifold characteristics and binocular characteristics trains a matrix after dimensionality reduction and whitening obtained from natural scene plane images through an orthogonal locality preserving projection algorithm, for obtaining a best mapping matrix. Image blocks, not important for visual perception, are removed. After finishing selecting the image blocks, through the best mapping matrix, manifold characteristic vectors of the image blocks are extracted, and a structural distortion of a distorted image is measured according to a manifold characteristic similarity. Considering influences of an image luminance variation on human eyes, a luminance distortion of the distorted image is calculated according to a mean value of the image blocks. After obtaining the manifold similarity and the luminance similarity, quality values of the left and right viewpoint images are processed with linear weighting to obtain a quality value of the distorted stereoscopic image.

7 Claims, 1 Drawing Sheet

(51) Int. Cl.
*H04N 13/00* (2018.01)
*G06K 9/46* (2006.01)
*G06K 9/62* (2006.01)

(52) U.S. Cl.
CPC ... *H04N 13/00* (2013.01); *G06T 2207/10012* (2013.01); *G06T 2207/20081* (2013.01); *G06T 2207/30168* (2013.01)

(56) References Cited

U.S. PATENT DOCUMENTS

| | | | |
|---|---|---|---|
| 9,460,501 B1* | 10/2016 | Jiang | G06T 7/0002 |
| 2013/0194395 A1* | 8/2013 | Hannuksela | G02B 27/225 |
| | | | 348/51 |
| 2016/0300339 A1* | 10/2016 | Jiang | G06T 7/0002 |
| 2016/0301909 A1* | 10/2016 | Yu | G06T 7/0002 |

OTHER PUBLICATIONS

Yu, M., et al., "Objective stereo image quality assessment method based on perception feature set," Chinese Patent Publication CN104954778 (B), Abstract, May 2017.*

* cited by examiner

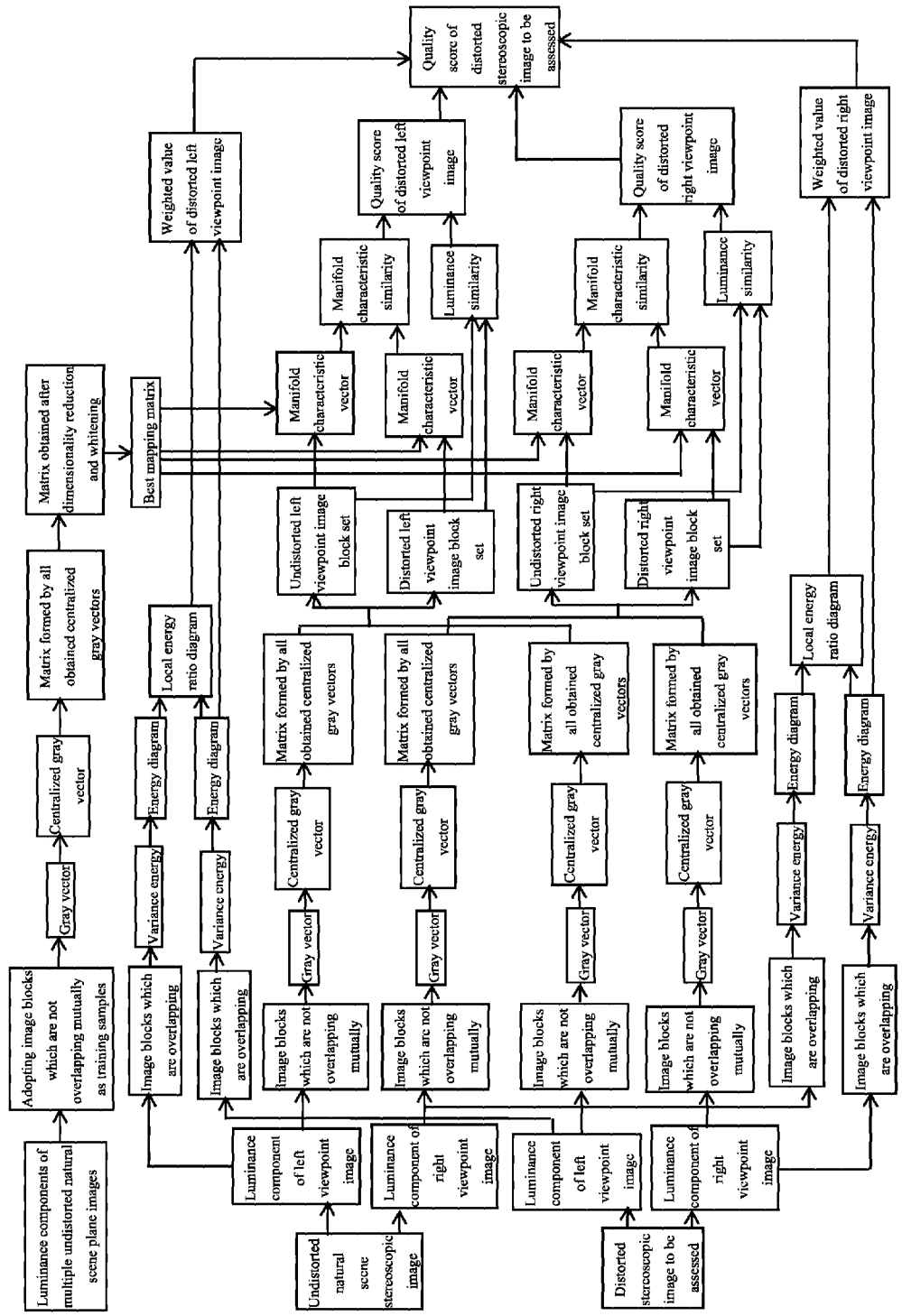

OBJECTIVE ASSESSMENT METHOD FOR STEREOSCOPIC IMAGE QUALITY COMBINED WITH MANIFOLD CHARACTERISTICS AND BINOCULAR CHARACTERISTICS

CROSS REFERENCE OF RELATED APPLICATION

The application claims priority under 35 U.S.C. 119(a-d) to CN 201610397239.6, filed Jun. 6, 2016.

BACKGROUND OF THE PRESENT INVENTION

Field of Invention

The present invention relates to a stereoscopic image quality assessment method, and more particularly to an objective assessment method for a stereoscopic image quality combined with manifold characteristics and binocular characteristics.

Description of Related Arts

The quantitative assessment for the stereoscopic image quality is a challenging problem in the image processing field. The stereoscopic image is different from the plane image that the stereoscopic image comprises two different viewpoints. When people view a stereoscopic image, the human visual system (HVS) does not separately process the left viewpoint image and the right viewpoint image, but generates a composite cyclopean image after complex binocular fusion and rivalry. The composite cyclopean image depends on not only the individual stimulating factor difference, but also the geometrical relationship between the two viewpoints. Thus, the quality of the stereoscopic image is related to not only the respective quality of the left viewpoint and the right viewpoint, but also the binocular visual perception.

The perception quality assessment method is to obtain an assessment result having a relatively high consistency with the visual perception quality through simulating the overall perception mechanism of the HVS. The excellent image quality assessment method is required to well reflect the visual perception characteristics of the human eyes. The conventional image quality assessment method based on the structure obtains the image quality from the structure information of the image, such as the edge and the contrast of the image, while the image quality assessment method based on the characteristics of the HVS assesses the image quality mainly from the distortion attention and perception ability of the human eyes. The above methods assess the image quality from the nonlinear geometrical structure of the image and the perception of the human eyes. However, some researches indicate that: for the visual perception phenomenon, the manifold is the basis of the perception and the human brain perceives the objects in the manifold manner; and, the natural scene image generally comprises the manifold structure and has the nonlinear nature of the manifold. Thus, combined with the manifold characteristics, the image quality of the single viewpoint in the stereoscopic image is able to be relatively well assessed.

On the other hand, for the binocular perception, when the left viewpoint and the right viewpoint are symmetrically distorted, it is relatively easy to assess the stereoscopic image quality, and two kinds of conventional methods are described as follows. The first kind of methods is to respectively assess the two viewpoints of the stereoscopic image with the quality assessment method for the plane image, and then average the quality values of the two viewpoints to obtain the quality value of the stereoscopic image. The second kind of methods is to assess the stereoscopic image quality with the left viewpoint and the right viewpoint of the stereoscopic image and the depth/disparity information of the stereoscopic image, wherein the depth/disparity information is assumed to have a certain effect on assessing the stereoscopic image quality by the HVS. However, the second kind of methods has two problems need to be considered. Firstly, the real depth/disparity image is not always useable, so that the second kind of methods generally assesses the quality of the depth perception of the stereoscopic image when estimating the depth image, and thus the accuracy of the depth/disparity estimation algorithm may greatly affect the assessment performance. Secondly, the depth/disparity information may not be related to the three-dimensional perception quality, which has been proved in the article of Kaptein et al. In the subjective experiment, Kaptein adopts the blurred images of the same object under the different depths, and find that, in the three-dimensional display, the depth does not affect the image perception quality to a certain extent.

Although above-mentioned problems exist, when assessing the symmetrically distorted stereoscopic image quality, the two kinds of methods achieve the relatively good quality assessment performance. However, if the left viewpoint and the right viewpoint comprise different degrees or different types of distortions (also called asymmetrical distortion stimulation), the above two kinds of methods both have a relatively poor quality assessment performance. The asymmetrical distortion leads to the more challenging stereoscopic image quality assessment problem, mainly because the quality of the composite cyclopean image generated by the human eyes is related to the distortion type and distribution of the left viewpoint and the right viewpoint. For example, two distorted stereoscopic images are provided, wherein the left viewpoint images of the two distorted stereoscopic images are both the similar high quality images, and the right viewpoint images of the two distorted stereoscopic images are both the similar low quality images. Through counting the observation results of the subjects, it is found that: for the distorted stereoscopic image whose right viewpoint has the white noise, the subjects think the quality of the composite virtual viewpoint image (namely the cyclopean image) is nearer to the low quality right viewpoint images; and, for the distorted stereoscopic image whose right viewpoint has the Gaussian blur, the subjects think the quality of the composite virtual viewpoint image (namely the cyclopean image) is nearer to the high quality left viewpoint images. Thus, effectively simulating the perception mechanism of the binocular asymmetrical distortion of the HVS is one of the keys to increase the performance of the stereoscopic image quality assessment algorithm. The reasonable effective binocular model is able to consider the binocular perception characteristics of the human eyes more comprehensive, and meanwhile increase the assessment effect on the symmetrically distorted and asymmetrically distorted stereoscopic image.

SUMMARY OF THE PRESENT INVENTION

An object of the present invention is to provide an objective assessment method for a stereoscopic image quality combined with manifold characteristics and binocular characteristics, which is able to obtain an objective assessment result having a relatively high consistency with a subjective perception quality.

Technical solutions of the present invention are described as follows.

An objective assessment method for a stereoscopic image quality combined with manifold characteristics and binocular characteristics comprises steps of:

① selecting multiple undistorted natural scene plane images, and extracting a luminance component from each undistorted natural scene plane image;

then, dividing the luminance component of each undistorted natural scene plane image into image blocks which are not overlapping mutually and have a size of 8×8;

next, randomly selecting N image blocks from all the image blocks of the luminance components of all the undistorted natural scene plane images; adopting each selected image block as a training sample; and denoting an $i^{th}$ training sample as $x_i$; wherein: $5000 \leq N \leq 20000$, and $1 \leq i \leq N$;

subsequently, forming a gray vector through arranging pixel values of all pixels in each training sample; and denoting a gray vector formed through arranging pixel values of all pixels in the $x_i$ as $x_i^{col}$, wherein: the $x_i^{col}$ has a dimensionality of 64×1; and, a value of a $1^{st}$ element to a $64^{th}$ element in the $x_i^{col}$ respectively correspond to the pixel value of each pixel in the $x_i$ in a line-by-line scanning manner;

afterwards, for each gray vector corresponding to each training sample, subtracting a mean value of values of all elements in the gray vector from a value of each element in the gray vector, so as to centralize the gray vector corresponding to each training sample; and denoting a gray vector obtained after centralizing the $x_i^{col}$ as $\hat{x}_i^{col}$; and finally, denoting a matrix formed by all obtained centralized gray vectors as $X$, $X=[\hat{x}_1^{col}, \hat{x}_2^{col}, \ldots, \hat{x}_N^{col}]$, wherein: the $X$ has a dimensionality of 64×N; the $\hat{x}_1^{col}, \hat{x}_2^{col}, \ldots, \hat{x}_N^{col}$ respectively represent a gray vector obtained after centralizing a gray vector formed through arranging pixel values of all pixels in a $1^{st}$ training sample, a gray vector obtained after centralizing a gray vector formed through arranging pixel values of all pixels in a $2^{nd}$ training sample, . . . , and a gray vector obtained after centralizing a gray vector formed through arranging pixel values of all pixels in an $N^{th}$ training sample; and a symbol "[]" is a vector representation symbol;

② processing the X with dimensionality reduction and whitening through a principal component analysis, and denoting an obtained matrix after the dimensionality reduction and whitening as $X^W$, wherein: the $X^W$ has a dimensionality of M×N; and the M is a set low dimensionality, $1<M<64$;

③ training N column vectors in the $X^W$ through an orthogonal locality preserving projection algorithm, and obtaining a best mapping matrix of eight orthogonal bases of the $X^W$, denoted as $J^W$, wherein the $J^W$ has a dimensionality of 8×M; and then, according to the $J^W$ and a whitened matrix, calculating a best mapping matrix of an original sample space, denoted as J, $J=J^W \times W$, wherein: the J has a dimensionality of 8×64; the W represents the whitened matrix; and the W has a dimensionality of M×64;

④ representing an original undistorted natural scene stereoscopic image having a width of W' and a height of H' by $I_{org}$; respectively denoting a left viewpoint image and a right viewpoint image of the $I_{org}$ as $I_{org}^L$ and $I_{org}^R$, and extracting luminance components respectively from the $I_{org}^L$ and the $I_{org}^R$; representing a distorted stereoscopic image of the $I_{org}$ after distortion by $I_{dis}$; adopting the $I_{dis}$ as a distorted stereoscopic image to be assessed; respectively denoting a left viewpoint image and a right viewpoint image of the $I_{dis}$ as $I_{dis}^L$ and $I_{dis}^R$, and extracting luminance components respectively from the $I_{dis}^L$ and the $I_{dis}^R$;

then, dividing the luminance components of the $I_{org}^L$, the $I_{org}^R$, the $I_{dis}^L$, and the $I_{dis}^R$ respectively into $$\left\lfloor \frac{W'}{8} \right\rfloor \times \left\lfloor \frac{H'}{8} \right\rfloor$$

image blocks which are not overlapping mutually and have a size of 8×8; denoting a $j^{th}$ image block in the luminance component of the $I_{org}^L$ as $x_j^{ref,L}$; denoting a $j^{th}$ image block in the luminance component of the $I_{org}^R$ as $x_j^{ref,R}$; denoting a $j^{th}$ image block in the luminance component of the $I_{dis}^L$ as $x_j^{dis,L}$; and denoting a $j^{th}$ image block in the luminance component of the $I_{dis}^R$ as $x_j^{dis,R}$; wherein a symbol "⌊ ⌋" is a floor symbol; $1 \leq j \leq N'$; and $$N' = \left\lfloor \frac{W'}{8} \right\rfloor \times \left\lfloor \frac{H'}{8} \right\rfloor;$$

next, forming a gray vector through arranging pixel values of all pixels in each image block of the luminance component of the $I_{org}^L$, and denoting a gray vector formed through arranging pixel values of all pixels in the $x_j^{ref,L}$ as $x_j^{ref,L,col}$; forming a gray vector through arranging pixel values of all pixels in each image block of the luminance component of the $I_{org}^R$, and denoting a gray vector formed through arranging pixel values of all pixels in the $x_j^{ref,R}$ as $x_j^{ref,R,col}$; forming a gray vector through arranging pixel values of all pixels in each image block of the luminance component of the $I_{dis}^L$, and denoting a gray vector formed through arranging pixel values of all pixels in the $x_j^{dis,L}$ as $x_j^{dis,L,col}$; forming a gray vector through arranging pixel values of all pixels in each image block of the luminance component of the $I_{dis}^R$, and denoting a gray vector formed through arranging pixel values of all pixels in the $x_j^{dis,R}$ as $x_j^{dis,R,col}$; wherein: the $x_j^{ref,L,col}$, the $x_j^{ref,R,col}$, the $x_j^{dis,L,col}$, and the $x_j^{dis,R,col}$ all have a dimensionality of 64×1; a value of a $1^{st}$ element to a $64^{th}$ element in the $x_j^{ref,L,col}$ respectively correspond to the pixel value of each pixel in the $x_j^{ref,L}$ in the line-by-line scanning manner; a value of a $1^{st}$ element to a $64^{th}$ element in the $x_j^{ref,R,col}$ respectively correspond to the pixel value of each pixel in the $x_j^{ref,R}$ in the line-by-line scanning manner; a value of $1^{st}$ element to a $64^{th}$ element in the $x_j^{dis,L,col}$ respectively correspond to the pixel value of each pixel in the $x_j^{dis,L}$ in the line-by-line scanning manner; and, a value of a $1^{st}$ element to a $64^{th}$ element in the $x_j^{dis,R,col}$ respectively correspond to the pixel value of each pixel in the $x_j^{dis,R}$ in the line-by-line scanning manner;

afterwards, for each gray vector corresponding to each image block of the luminance component of the $I_{org}^L$, subtracting a mean value of values of all elements in the gray vector from a value of each element in the gray vector, so as to centralize the gray vector corresponding to each image block of the luminance component of the $I_{org}^L$, and denoting a gray vector obtained after centralizing the $x_j^{ref,L,col}$ as $\hat{x}_j^{ref,L,col}$; for each gray vector corresponding to each image block of the luminance component of the $I_{org}^R$, subtracting a mean value of values of all elements in the gray vector from a value of each element in the gray vector, so as to centralize the gray vector corresponding to each image block of the luminance component of the $I_{org}^R$, and denoting a gray vector obtained after centralizing the $x_j^{ref,R,col}$ as $\hat{x}_j^{ref,R,col}$; for each gray vector corresponding to each image block of the luminance component of the $I_{dis}^L$, subtracting a mean value of values of all elements in the gray vector from a value of each element in the gray vector, so as to centralize the gray vector corresponding to each image block of the luminance component of the $I_{dis}^L$, and denoting a gray vector obtained after centralizing the $x_j^{dis,L,col}$ as $\hat{x}_j^{dis,L,col}$; for each gray vector corresponding to each image block of the luminance component of the $I_{dis}^R$, subtracting a mean value of values of all elements in the gray vector from a value of each element in the gray vector, so as to centralize the gray vector corresponding to each image block of the luminance component of the $I_{dis}^R$, and denoting a gray vector obtained after centralizing the $x_j^{dis,R,col}$ as $\hat{x}_j^{dis,R,col}$; and finally, denoting a matrix formed by all obtained centralized gray vectors corresponding to the luminance component of the $I_{org}^L$ as $X^{ref,L}$, $X^{ref,L}=[\hat{x}_1^{ref,L,col}, \hat{x}_2^{ref,L,col}, \ldots, \hat{x}_{N'}^{ref,L,col}]$; denoting a matrix formed by all obtained centralized gray vectors corresponding to the luminance component of the $I_{org}^R$ as $X^{ref,R}$, $X^{ref,R}=[\hat{x}_1^{ref,R,col}, \hat{x}_2^{ref,R,col}, \ldots, \hat{x}_{N'}^{ref,R,col}]$; denoting a matrix formed by all obtained centralized gray vectors corresponding to the luminance component of the $I_{dis}^L$ as $X^{dis,L}$, $X^{dis,L}=[\hat{x}_1^{dis,L,col}, \hat{x}_2^{dis,L,col}, \ldots, \hat{x}_{N'}^{dis,L,col}]$; and, denoting a matrix formed by all obtained centralized gray vectors corresponding to the luminance component of the $I_{dis}^R$ as $X^{dis,R}$, $X^{dis,R}=[\hat{x}_1^{dis,R,col}, \hat{x}_2^{dis,R,col}, \ldots, \hat{x}_{N'}^{dis,R,col}]$; wherein the $X^{ref,L}$, the $X^{ref,R}$, the $X^{dis,L}$, and the $X^{dis,R}$ all have a dimensionality of 64×N'; the $\hat{x}_1^{ref,L,col}, \hat{x}_2^{ref,L,col}, \ldots, \hat{x}_{N'}^{ref,L,col}$ respectively represent a gray vector obtained after centralizing a gray vector formed through arranging pixel values of all pixels in a $1^{st}$ image block of the luminance component of the $I_{org}^L$, a gray vector obtained after centralizing a gray vector formed through arranging pixel values of all pixels in a $2^{nd}$ image block of the luminance component of the $I_{org}^L$, ..., and a gray vector obtained after centralizing a gray vector formed through arranging pixel values of all pixels in an $N'^{th}$ image block of the luminance component of the $I_{org}^L$; the $\hat{x}_1^{ref,R,col}, \hat{x}_2^{ref,R,col}, \ldots, \hat{x}_{N'}^{ref,R,col}$ respectively represent a gray vector obtained after centralizing a gray vector formed through arranging pixel values of all pixels in a $1^{st}$ image block of the luminance component of the $I_{org}^R$, a gray vector obtained after centralizing a gray vector formed through arranging pixel values of all pixels in a $2^{nd}$ image block of the luminance component of the $I_{org}^R$, ..., and a gray vector obtained after centralizing a gray vector formed through arranging pixel values of all pixels in an $N'^{th}$ image block of the luminance component of the $I_{org}^R$; the $\hat{x}_1^{dis,L,col}, \hat{x}_2^{dis,L,col}, \ldots, \hat{x}_{N'}^{dis,L,col}$ respectively represent a gray vector obtained after centralizing a gray vector formed through arranging pixel values of all pixels in a $1^{st}$ image block of the luminance component of the $I_{dis}^L$, a gray vector obtained after centralizing a gray vector formed through arranging pixel values of all pixels in a $2^{nd}$ image block of the luminance component of the $I_{dis}^L$, ..., and a gray vector obtained after centralizing a gray vector formed through arranging pixel values of all pixels in an $N'^{th}$ image block of the luminance component of the $I_{dis}^L$; the $\hat{x}_1^{dis,R,col}, \hat{x}_2^{dis,R,col}, \ldots, \hat{x}_{N'}^{dis,R,col}$ respectively represent a gray vector obtained after centralizing a gray vector formed through arranging pixel values of all pixels in a $1^{st}$ image block of the luminance component of the $I_{dis}^R$, ..., a gray vector obtained after centralizing a gray vector formed through arranging pixel values of all pixels in a $2^{nd}$ image block of the luminance component of the $I_{dis}^R$, ..., and a gray vector obtained after centralizing a gray vector formed through arranging pixel values of all pixels in an $N'^{th}$ image block of the luminance component of the $I_{dis}^R$; and the symbol "[ ]" is the vector representation symbol;

⑤ calculating a structural difference between each column vector in the $X^{ref,L}$ and a corresponding column vector in the $X^{dis,L}$, and denoting a structural difference between the $\hat{x}_j^{ref,L,col}$ and the $\hat{x}_j^{dis,L,col}$ as $\text{AVE}(\hat{x}_j^{ref,L,col}, \hat{x}_j^{dis,L,col})$; calculating a structural difference between each column vector in the $X^{ref,R}$ and a corresponding column vector in the $X^{dis,R}$, and denoting a structural difference between the $\hat{x}_j^{ref,R,col}$ and the $\hat{x}_j^{dis,R,col}$ as $\text{AVE}(\hat{x}_j^{ref,R,col}, \hat{x}_j^{dis,R,col})$;

then, forming a vector having a dimensionality of 1×N' through orderly arranging N' structural differences corresponding to the $X^{ref,L}$ and the $X^{dis,L}$, denoted as $v^L$; and, forming a vector having a dimensionality of 1×N' through orderly arranging N' structural differences corresponding to the $X^{ref,R}$ and the $X^{dis,R}$, denoted as $v^R$; wherein: a value of a $j^{th}$ element in the $v^L$ is $v_j^L$, $v_j^L=\text{AVE}(\hat{x}_j^{ref,L,col}, \hat{x}_j^{dis,L,col})$; and a value of a $j^{th}$ element in the $v^R$ is $v_j^R$, $v_j^R=\text{AVE}(\hat{x}_j^{ref,R,col}, \hat{x}_j^{dis,R,col})$; and obtaining an undistorted left viewpoint image block set, a distorted left viewpoint image block set, an undistorted right viewpoint image block set, and a distorted right viewpoint image block set, comprising steps of:

a1), setting a left viewpoint image block selection threshold $TH_1$ and a right viewpoint image block selection threshold $TH_2$;

a2), extracting all elements having a value larger than or equal to the $TH_1$ from the $v^L$, and extracting all elements having a value larger than or equal to the $TH_2$ from the $v^R$; and a3), adopting a set formed by the image blocks of the luminance component of the $I_{org}^L$ corresponding to the elements extracted from the $v^L$ as the undistorted left viewpoint image block set, denoted as $Y^{ref,L}$, $Y^{ref,L}=\{x_j^{ref,L}|\text{AVE}(\hat{x}_j^{ref,L,col}, \hat{x}_j^{dis,L,col})\geq TH_1, 1\leq j\leq N'\}$; adopting a set formed by the image blocks of the luminance component of the $I_{dis}^L$ corresponding to the elements extracted from the $v^L$ as the distorted left viewpoint image block set, denoted as $Y^{dis,L}$, $Y^{dis,L}=\{x_j^{dis,L}|\text{AVE}(\hat{x}_j^{ref,L,col}, \hat{x}_j^{dis,L,col})\geq TH_1, 1\leq j\leq N'\}$; adopting a set formed by the image blocks of the luminance component of the $I_{org}^R$ corresponding to the elements extracted from the $v^R$ as the undistorted right viewpoint image block set, denoted as $Y^{ref,R}$, $Y^{ref,R}=\{x_j^{ref,R}|\text{AVE}(\hat{x}_j^{ref,R,col}, \hat{x}_j^{dis,R,col})\geq TH_2, 1\leq j\leq N'\}$; and, adopting a set formed by the image blocks of the luminance component of the $I_{dis}^R$ corresponding to the elements extracted from the $V^R$ as the distorted right viewpoint image block set, denoted as $Y^{dis,R}$, $Y^{dis,R}=\{x_j^{dis,R}|\text{AVE}(\hat{x}_j^{ref,R,col}, \hat{x}_j^{dis,R,col})\geq TH_2, 1\leq j\leq N'\}$;

⑥ calculating a manifold characteristic vector of each image block in the $Y^{ref,L}$, and denoting a manifold characteristic vector of a $t^{th}$ image block in the $Y^{ref,L}$ as $r_t^{ref,L}$, $r_t^{ref,L}=J\times\hat{x}_t^{ref,L,col}$; calculating a manifold characteristic vector of each image block in the $Y^{dis,L}$, and denoting a manifold characteristic vector of a $t^{th}$ image block in the $Y^{dis,L}$ as $d_t^{dis,L}$, $d_t^{dis,L}=J\times\hat{x}_t^{dis,L,col}$; calculating a manifold characteristic vector of each image block in the $Y^{ref,R}$, and denoting a manifold characteristic vector of a $t'^{th}$ image block in the $Y^{ref,R}$ as $r_{t'}^{ref,R}$, $r_{t'}^{ref,R}=J\times\hat{x}_{t'}^{ref,R,col}$; calculating a manifold characteristic vector of each image block in the $Y^{dis,R}$, and denoting a manifold characteristic vector of a $t'^{th}$ image block in the $Y^{dis,R}$ as $d_{t'}^{dis,R}$, $d_{t'}^{dis,R}=J\times\hat{x}_{t'}^{dis,R,col}$; wherein: $1\leq t\leq K$, the K represents a total number of the image blocks in the $Y^{ref,L}$, namely a total number of the image blocks in the $Y^{dis,L}$; $1\leq t'\leq K'$, the K' represents a total number of the image blocks in the $Y^{ref,R}$, namely a total number of the image blocks in the $Y^{dis,R}$; the $r_t^{ref,L}$, the $d_t^{dis,L}$, the $r_{t'}^{ref,R}$, and the $d_{t'}^{dis,R}$ all have a dimensionality of 8×1; the $\hat{x}_t^{ref,L,col}$ represents a gray vector obtained after centralizing a gray vector formed through arranging pixel values of all pixels in the $t^{th}$ image block of the $Y^{ref,L}$; the $\hat{x}_t^{dis,L,col}$ represents a gray vector obtained after centralizing a gray vector formed through arranging pixel values of all pixels in the $t^{th}$ image block of the $Y^{dis,L}$; the $\hat{x}_{t'}^{ref,R,col}$ represents a gray vector obtained after centralizing a gray vector formed through arranging pixel values of all pixels in the $t'^{th}$ image block of the $Y^{ref,R}$; and, the $\hat{x}_{t'}^{dis,R,col}$ represents a gray vector obtained after centralizing a gray vector formed through arranging pixel values of all pixels in the $t'^{th}$ image block of the $Y^{dis,R}$;

then, forming a matrix by the manifold characteristic vectors of all the image blocks in the $Y^{ref,L}$, denoted as $R^L$; forming a matrix by the manifold characteristic vectors of all the image blocks in the $Y^{dis,L}$, denoted as $D^L$; forming a matrix by the manifold characteristic vectors of all the image blocks in the $Y^{ref,R}$, denoted as $R^R$; and, forming a matrix by the manifold characteristic vectors of all the image blocks in the $Y^{dis,R}$, denoted as $D^R$; wherein: the $R^L$ and the $D^L$ both have a dimensionality of 8×K; the $R^R$ and the $D^R$ both have a dimensionality of 8×K'; a $t^{th}$ column vector in the $R^L$ is the $r_t^{ref,L}$; a $t^{th}$ column vector in the $D^L$ is the $d_t^{dis,L}$; a $t'^{th}$ column vector in the $R^R$ is the $r_{t'}^{ref,R}$; and, a $t'^{th}$ column vector in the $D^R$ is the $d_{t'}^{dis,R}$; and calculating a manifold characteristic similarity between the luminance component of the $I_{org}^L$ and the luminance component of the $I_{dis}^L$, denoted as $MFS_1^L$, $$MFS_1^L = \frac{1}{8 \times K} \sum_{m=1}^{8} \sum_{t=1}^{K} \frac{2R_{m,t}^L D_{m,t}^L + C_1}{(R_{m,t}^L)^2 + (D_{m,t}^L)^2 + C_1};$$

and, calculating a manifold characteristic similarity between the luminance component of the $I_{org}^R$ and the luminance component of the $I_{dis}^R$, denoted as $MFS_1^R$, $$MFS_1^R = \frac{1}{8 \times K'} \sum_{m=1}^{8} \sum_{t'=1}^{K'} \frac{2R_{m,t'}^R D_{m,t'}^R + C_1}{(R_{m,t'}^R)^2 + (D_{m,t'}^R)^2 + C_1};$$

wherein: the $R_{m,t}^L$ represents a value of an element in a $m^{th}$ row and a $t^{th}$ column of the $R^L$; the $D_{m,t}^L$ represents a value of an element in a $m^{th}$ row and a $t^{th}$ column of the $D^L$; the $R_{m,t'}^R$ represents a value of an element in a $m^{th}$ row and a $t^{th}$ column of the $R^R$; the $D_{m,t'}^R$ represents a value of an element in a $m^{th}$ row and a $t^{th}$ column of the $D^R$; and, the $C_1$ is a small constant for guaranteeing a result stability;

⑦ calculating a luminance similarity between the luminance component of the $I_{org}^L$ and the luminance component of the $I_{dis}^L$, denoted as $MFS_2^L$, $$MFS_2^L = \frac{\sum_{t=1}^{K} (\mu_t^{ref,L} - \overline{\mu}^{ref,L}) \times (\mu_t^{dis,L} - \overline{\mu}^{dis,L}) + C_2}{\sqrt{\sum_{t=1}^{K} (\mu_t^{ref,L} - \overline{\mu}^{ref,L})^2 \times \sum_{t=1}^{K} (\mu_t^{dis,L} - \overline{\mu}^{dis,L})^2} + C_2};$$

and, calculating a luminance similarity between the luminance component of the $I_{org}^R$, and the luminance component of the $I_{dis}^R$, denoted as $MFS_2^R$, $$MFS_2^R = \frac{\sum_{t'=1}^{K'} (\mu_{t'}^{ref,R} - \overline{\mu}^{ref,R}) \times (\mu_{t'}^{dis,R} - \overline{\mu}^{dis,R}) + C_2}{\sqrt{\sum_{t'=1}^{K'} (\mu_{t'}^{ref,R} - \overline{\mu}^{ref,R})^2 \times \sum_{t'=1}^{K'} (\mu_{t'}^{dis,R} - \overline{\mu}^{dis,R})^2} + C_2};$$

wherein: the $\mu_t^{ref,L}$ represents a mean value of the pixel values of all the pixels in the $t^{th}$ image block of the $Y^{ref,L}$, $$\overline{\mu}^{ref,L} = \frac{\sum_{t=1}^{K} \mu_t^{ref,L}}{K};$$

the $\mu_t^{dis,L}$ represents a mean value of the pixel values of all the pixels in the $t^{th}$ image block of the $Y^{dis,L}$, $$\overline{\mu}^{dis,L} = \frac{\sum_{t=1}^{K} \mu_t^{dis,L}}{K};$$

the $\mu_{t'}^{ref,R}$ represents a mean value of the pixel values of all the pixels in the $t'^{th}$ image block of the $Y^{ref,R}$, $$\overline{\mu}^{ref,R} = \frac{\sum_{t'=1}^{K'} \mu_{t'}^{ref,R}}{K'};$$

the $\mu_{t'}^{dis,R}$ represents a mean value of the pixel values of all the pixels in the $t'^{th}$ image block of the $Y^{dis,R}$, $$\overline{\mu}^{dis,R} = \frac{\sum_{t'=1}^{K'} \mu_{t'}^{dis,R}}{K'};$$

and, the $C_2$ is a small constant for guaranteeing a result stability;

⑧ processing the $MFS_1^L$ and the $MFS_2^L$ with power exponent weighting, so as to obtain a quality score of the $I_{dis}^L$, denoted as $MFS^L$, $MFS^L = (MFS_1^L)^\alpha \times (MFS_2^L)^\beta$; and, processing the $MFS_1^R$ and the $MFS_2^R$ with the power exponent weighting, so as to obtain a quality score of the $I_{dis}^R$, denoted as $MFS^R$, $MFS^R = (MFS_1^R)^\alpha \times (MFS_2^R)^\beta$; wherein: the $\alpha$ is for adjusting a relative importance of the $MFS_1^L$ and the $MFS_1^R$; the $\beta$ is for adjusting a relative importance of the $MFS_2^L$ and the $MFS_2^R$; and, $\alpha + \beta = 1$; and ⑨ obtaining a weighted value of the $I_{dis}^L$ and a weighted value of the $I_{dis}^R$ through a binocular rivalry model, respectively denoted as $\omega^L$ and $\omega^R$; weighting the $MFS^L$ through the $\omega^L$, and weighting the $MFS^R$ through the $\omega^R$, so as to obtain a quality value of the $I_{dis}$, denoted as Q, $Q = \omega^L \times$ $MFS^L + \omega^R \times MFS^R$; wherein: the $\omega^L$ is for adjusting a relative importance of the $MFS^L$; the $\omega^R$ is for adjusting a relative importance of the $MFS^R$; and, $\omega^L + \omega^2 = 1$.

Preferably, in the step ②, the $X^W$ is obtained through following steps of:

②-1, calculating a covariance matrix of the X, denoted as C, $$C = \frac{1}{N}(X \times X^T),$$

wherein: the C has a dimensionality of 64×64; and, the $X^T$ is a transposed matrix of the X;

②-2, processing the C with eigenvalue decomposition, and decomposing the C into an eigenvalue diagonal matrix and an eigenvector matrix, respectively denoted as ψ and E, wherein: the ψ has a dimensionality of 64×64, $$\Psi = \begin{bmatrix} \Psi_1 & 0 & \cdots & 0 \\ 0 & \Psi_2 & \cdots & 0 \\ \cdots & \cdots & \cdots & \cdots \\ 0 & 0 & 0 & \Psi_{64} \end{bmatrix};$$

the $\psi_1$, the $\psi_2$, and the $\psi_{64}$ respectively represent a $1^{st}$ eigenvalue, a $2^{nd}$ eigenvalue, and a $64^{th}$ eigenvalue obtained through decomposing; the E has a dimensionality of 64×64, $E=[e_1\ e_2\ \ldots\ e_{64}]$; the $e_1$, the $e_2$, and the $e_{64}$ respectively represent a $1^{st}$ eigenvector, a $2^{nd}$ eigenvector, and a $64^{th}$ eigenvector obtained through decomposing; and, the $e_1$, the $e_2$, and the $e_{64}$ all have a dimensionality of 64×1;

②-3, calculating the whitened matrix, denoted as the W, $$W = \Psi_{M \times 64}^{-\frac{1}{2}} \times E^T,$$

wherein: the W has the dimensionality of M×64;

$$\Psi_{M \times 64}^{-\frac{1}{2}} = \begin{bmatrix} 1/\sqrt{\Psi_1} & 0 & \cdots & 0 & \cdots & 0 \\ 0 & 1/\sqrt{\Psi_2} & \cdots & 0 & \cdots & 0 \\ \cdots & \cdots & \cdots & \cdots & \cdots & \cdots \\ 0 & 0 & \cdots & 1/\sqrt{\Psi_M} & \cdots & 0 \end{bmatrix};$$

the $\psi_M$ represents an $M^{th}$ eigenvalue obtained through decomposing; the M is the set low dimensionality, 1<M<64; and, the $E^T$ is a transposed matrix of the E; and ②-4, calculating the matrix $X^W$ obtained after the dimensionality reduction and whitening, wherein $X^W = W \times X$.

Preferably, in the step ⑤, $$AVE(\hat{x}_j^{ref,L,col}, \hat{x}_j^{dis,L,col}) = \left| \sum_{g=1}^{64} (\hat{x}_j^{ref,L,col}(g))^2 - \sum_{g=1}^{64} (\hat{x}_j^{dis,L,col}(g))^2 \right|,$$

and $$AVE(\hat{x}_j^{ref,R,col}, \hat{x}_j^{dis,R,col}) = \left| \sum_{g=1}^{64} (\hat{x}_j^{ref,R,col}(g))^2 - \sum_{g=1}^{64} (\hat{x}_j^{dis,R,col}(g))^2 \right|,$$

wherein: a symbol "| |" is an absolute value symbol; the $\hat{x}_j^{ref,L,col}(g)$ represents a value of a $g^{th}$ element in the $\hat{x}_j^{ref,L,col}$; the $\hat{x}_j^{dis,L,col}(g)$ represents a value of a $g^{th}$ element in the $\hat{x}_j^{dis,L,col}$; the $\hat{x}_j^{ref,R,col}(g)$ represents a value of a $g^{th}$ element in the $\hat{x}_j^{ref,R,col}$; and, the $\hat{x}_j^{dis,R,col}(g)$ represents a value of a $g^{th}$ element in the $\hat{x}_j^{dis,R,col}$.

Preferably, in the step a1) of the step ⑤, $TH_1$=median $(v^L)$, and $TH_2$=median$(v^R)$; wherein: the median( ) is a mid-value selection function; the median$(v^L)$ is to find a mid-value of values of all elements in the $v^L$; and the median$(v^R)$ is to find a mid-value of values of all elements in the $v^R$.

Preferably, in the step ⑨, the $\omega^L$ and the $\omega^R$ are obtained through following steps of:

⑨-1, sliding in the $I_{org}^L$ pixel by pixel with a sliding window having a size of Q×Q, dividing the $I_{org}^L$ into $$\left(W' - \frac{Q-1}{2}\right) \times \left(H' - \frac{Q-1}{2}\right)$$

image blocks which are overlapping and have a size of Q×Q, and denoting a $p^{th}$ image block in the $I_{org}^L$ as $B_p^{ref,L}$; sliding in the $I_{dis}^L$ pixel by pixel with the sliding window having the size of Q×Q, dividing the $I_{dis}^L$ into $$\left(W' - \frac{Q-1}{2}\right) \times \left(H' - \frac{Q-1}{2}\right)$$

image blocks which are overlapping and have a size of Q×Q, and denoting a $p^{th}$ image block in the $I_{dis}^L$ as $B_p^{dis,L}$; sliding in the $I_{org}^R$ pixel by pixel with the sliding window having the size of Q×Q, dividing the $I_{org}^R$ into $$\left(W' - \frac{Q-1}{2}\right) \times \left(H' - \frac{Q-1}{2}\right)$$

image blocks which are overlapping and have a size of Q×Q, and denoting a $p^{th}$ image block in the $I_{org}^R$ as $B_p^{ref,R}$; sliding in the $I_{dis}^R$ pixel by pixel with the sliding window having the size of Q×Q, dividing the $I_{dis}^R$ into $$\left(W' - \frac{Q-1}{2}\right) \times \left(H' - \frac{Q-1}{2}\right)$$

image blocks which are overlapping and have a size of Q×Q, and denoting a $p^{th}$ image block in the $I_{dis}^R$ as $B_p^{dis,R}$; wherein: 9≤Q≤37; the Q is an odd number; and $$1 \leq p \leq \left(W' - \frac{Q-1}{2}\right) \times \left(H' - \frac{Q-1}{2}\right);$$

⑨-2, adopting a Gaussian low-pass filtering function, and arranging a size of a required convolution mask to be Q×Q and a standard deviation to be ζ, so as to obtain a convolution mask, wherein $3 \leq \zeta \leq 6$; and, normalizing a value of each element in the convolution mask, so as to obtain a normalized convolution mask; wherein: a normalized value of each element in the convolution mask is obtained through dividing the value of each element in the convolution mask by a sum of values of all elements in the convolution mask;

⑨-3, through the normalized convolution mask, obtaining a weighted mean value of pixel values of all pixels in each image block of the $I_{org}^L$, and denoting a weighted mean value of pixel values of all pixels in the $B_p^{ref,L}$ as $\overline{b}_p^{ref,L}$, $$\overline{b}_p^{ref,L} = \frac{\sum_{u=1}^{Q}\sum_{v=1}^{Q} \text{Mode}(u,v) \times B_p^{ref,L}(u,v)}{Q \times Q};$$

through the normalized convolution mask, obtaining a weighted mean value of pixel values of all pixels in each image block of the $I_{dis}^L$, and denoting a weighted mean value of pixel values of all pixels in the $B_p^{dis,L}$ as $\overline{b}_p^{dis,L}$, $$\overline{b}_p^{dis,L} = \frac{\sum_{u=1}^{Q}\sum_{v=1}^{Q} \text{Mode}(u,v) \times B_p^{dis,L}(u,v)}{Q \times Q};$$

through the normalized convolution mask, obtaining a weighted mean value of pixel values of all pixels in each image block of the $I_{org}^L$, and denoting a weighted mean value of pixel values of all pixels in the $B_p^{ref,R}$ as $\overline{b}_p^{ref,R}$, $$\overline{b}_p^{ref,R} = \frac{\sum_{u=1}^{Q}\sum_{v=1}^{Q} \text{Mode}(u,v) \times B_p^{ref,R}(u,v)}{Q \times Q};$$

through the normalized convolution mask, obtaining a weighted mean value of pixel values of all pixels in each image block of the $I_{dis}^R$, and denoting a weighted mean value of pixel values of all pixels in the $B_p^{dis,R}$ as $\overline{b}_p^{dis,R}$, $$\overline{b}_p^{dis,R} = \frac{\sum_{u=1}^{Q}\sum_{v=1}^{Q} \text{Mode}(u,v) \times B_p^{dis,R}(u,v)}{Q \times Q};$$

wherein: $1 \leq u \leq Q$, $1 \leq v \leq Q$; the Mode(u, v) represents a value of an element having a subscript of (u, v) in the normalized convolution mask; the $B_p^{ref,L}$ (u, v) represents a pixel value of a pixel having coordinates of (u, v) in the $B_p^{ref,L}$; the $B_p^{dis,L}$ (u, v) represents a pixel value of a pixel having coordinates of (u, v) in the $B_p^{dis,L}$; the $B_p^{ref,R}$ (u, v) presents a pixel value of a pixel having coordinates of (u, v) in the $B_p^{ref,R}$; and, the $B_p^{dis,R}$(u, v) represents a pixel value of a pixel having coordinates of (u, v) in the $B_p^{dis,R}$;

⑨-4, according to the weighted mean value of the pixel values of all the pixels in each image block of the $I_{org}^L$, calculating a variance of the pixel values of all the pixels in each image block of the $I_{org}^L$ to serve as a variance energy; according to the weighted mean value of the pixel values of all the pixels in each image block of the $I_{dis}^L$, calculating a variance of the pixel values of all the pixels in each image block of the $I_{dis}^L$ to serve as a variance energy; according to the weighted mean value of the pixel values of all the pixels in each image block of the $I_{org}^R$, calculating a variance of the pixel values of all the pixels in each image block of the $I_{org}^R$ to serve as a variance energy; and, according to the weighted mean value of the pixel values of all the pixels in each image block of the $I_{dis}^R$, calculating a variance of the pixel values of all the pixels in each image block of the $I_{dis}^R$ to serve as a variance energy;

⑨-5, according to the variance energy corresponding to each image block in the $I_{org}^L$, obtaining an energy diagram of the $I_{org}^L$, denoted as $E^{ref,L}$; according to the variance energy corresponding to each image block in the $I_{dis}^L$, obtaining an energy diagram of the $I_{dis}^L$, denoted as $E^{dis,L}$; according to the variance energy corresponding to each image block in the $I_{org}^R$, obtaining an energy diagram of the $I_{org}^R$, denoted as $E^{ref,R}$; and, according to the variance energy corresponding to each image block in the $I_{dis}^R$, obtaining an energy diagram of the $I_{dis}^R$, denoted as $E^{dis,R}$; wherein: the $E^{ref,L}$, the $E^{dis,L}$, the $E^{ref,R}$, and the $E^{dis,R}$ all have a width of $$W' - \frac{Q-1}{2}$$

and a height of $$H' - \frac{Q-1}{2};$$

a pixel value $E^{ref,L}$ (p) of a $p^{th}$ pixel in the $E^{ref,L}$ is equal to a variance energy corresponding to a $p^{th}$ image block in the $I_{org}^L$; a pixel value $E^{dis,L}$ (p) of a $p^{th}$ pixel in the $E^{dis,L}$ is equal to a variance energy corresponding to a $p^{th}$ image block in the $I_{dis}^L$; a pixel value $E^{ref,R}$ (p) of a $p^{th}$ pixel in the $E^{ref,R}$ is equal to a variance energy corresponding to a $p^{th}$ image block in the $I_{org}^R$; and, a pixel value $E^{dis,R}$ (p) of a $p^{th}$ pixel in the $E^{dis,R}$ is equal to a variance energy corresponding to a $p^{th}$ mage block in the $I_{dis}^R$;

⑨-6, calculating a local energy ratio diagram of the left viewpoint image, denoted as $\text{Ratio}^L$; denoting a pixel value of a $p^{th}$ pixel in the $\text{Ratio}^L$ as $\text{Ratio}^L$ (p), $$\text{Ratio}^L(p) = \frac{E^{dis,L}(p)}{E^{ref,L}(p)};$$

calculating a local energy ratio diagram of the right viewpoint image, denoted as $\text{Ratio}^R$; and, denoting a pixel value of a $p^{th}$ pixel in the $\text{Ratio}^R$ as $\text{Ratio}^R$ (p), $$\text{Ratio}^R(p) = \frac{E^{dis,R}(p)}{E^{ref,R}(p)};$$

wherein: the $\text{Ratio}^L$ and the $\text{Ratio}^R$ both have a width of $$W' - \frac{Q-1}{2}$$

and a height of $$H' - \frac{Q-1}{2};$$

and

⑨-7, calculating the $\omega^L$, $$\omega^L = \frac{(g^L)^2}{(g^L)^2 + (g^R)^2};$$

and, calculating the $\omega^R$, $$\omega^R = \frac{(g^R)^2}{(g^L)^2 + (g^R)^2};$$

wherein:

$$g^L = \frac{\sum_{p=1}^{\left(W'-\frac{Q-1}{2}\right)\times\left(H'-\frac{Q-1}{2}\right)} E^{dis,L}(p) \times Ratio^L(p)}{\sum_{p=1}^{\left(W'-\frac{Q-1}{2}\right)\times\left(H'-\frac{Q-1}{2}\right)} E^{dis,L}(p)};$$

and $$g^R = \frac{\sum_{p=1}^{\left(W'-\frac{Q-1}{2}\right)\times\left(H'-\frac{Q-1}{2}\right)} E^{dis,R}(p) \times Ratio^R(p)}{\sum_{p=1}^{\left(W'-\frac{Q-1}{2}\right)\times\left(H'-\frac{Q-1}{2}\right)} E^{dis,R}(p)}.$$

Compared with prior arts, the present invention has following advantages.

1) Based on the perception of the human eyes in the manifold manner, the method provided by the present invention trains the matrix after the dimensionality reduction and whitening obtained from the natural scene plane images through the orthogonal locality preserving projection algorithm, so as to obtain the general best mapping matrix. In order to improve the assessment accuracy and stability, the method provided by the present invention firstly adopts a visual threshold strategy to remove the image blocks which are not important for the visual perception. After finishing selecting the image blocks, the manifold characteristic vectors of the selected image blocks are extracted through the best mapping matrix. Then, through the manifold characteristic similarity, the structural distortion of the distorted image is measured. Next, considering the influence of the image luminance variation on the human eyes, the luminance distortion of the distorted image is calculated based on the mean value of the image blocks, so that the method provided by the present invention has a higher assessment accuracy and an assessment ability of the method on the various distortions is expanded, which is able to objectively reflect the change of the visual quality of the image under the influence of the various image processing and compressing methods. Moreover, after obtaining the manifold similarity and luminance similarity corresponding to the respective luminance component of the left viewpoint image and the right viewpoint image, considering the influence of the binocular rivalry on the quality of the distorted stereoscopic image to be assessed, the method provided by the present invention adopts the easy and effective binocular rivalry model to process the quality values respectively of the left viewpoint image and the right viewpoint image with the linear weighting, so as to obtain the quality value of the distorted stereoscopic image to be assessed. Through the above step, the method provided by the present invention obtains the assessment result which is nearer to the subjective assessment of the human eyes on the quality assessment of the symmetrically distorted stereoscopic image, and improves the performance on the quality assessment of the asymmetrically distorted stereoscopic image. Thus, the final assessment result obtained by the method provided by the present invention has the higher consistency with the subjective perception assessment result of the human eyes.

2) The assessment performance of method provided by the present invention is little affected by the various stereoscopic image databases. Through different training databases, the obtained performance results are almost same. Thus, the best mapping matrix of the method provided by the present invention is a general manifold characteristic extractor. Once the best mapping matrix is obtained through training with the orthogonal locality preserving projection algorithm, the best mapping matrix is applicable in the assessment for all the distorted stereoscopic image qualities, without the time-consuming training for each assessment. Moreover, the plane images for training and the distorted stereoscopic images for testing are mutually independent. Thus, the immoderate reliance of the test result on the training data is avoided, which is able to effectively increase the correlation between the objective assessment result and the subjective perception quality.

These and other objectives, features, and advantages of the present invention will become apparent from the following detailed description, the accompanying drawings, and the appended claims.

BRIEF DESCRIPTION OF THE DRAWINGS

The FIGURE is an implementation block diagram of an objective assessment method for a stereoscopic image quality combined with manifold characteristics and binocular characteristics according to a preferred embodiment of the present invention.

DETAILED DESCRIPTION OF THE PREFERRED EMBODIMENT

The present invention is further illustrated with an accompanying drawing and a preferred embodiment in detail.

An excellent image quality assessment method is able to well reflect visual perception characteristics of human eyes. For a visual perception phenomenon, some researches indicate that: a manifold is a basis of perception; human perception is based on perceiving the manifold and a topological continuity, namely the human perception is limited on a low-dimensional manifold; a human brain perceives objects in a manifold manner; and, a neuronal group activity in the human brain is generally described as a result of a neural discharge rate set and thus is able to be represented as a point in an abstract space having a dimensionality equal to a neuron number. The researches indicate that a discharge rate of each neuron in a neuronal group is able to be represented by a smooth function having a few variables, which illustrates the neuronal group activity is limited on the low-dimensional manifold. Thus, through applying image manifold characteristics in a visual quality assessment, an assessment result having a relatively high consistency with a subjective perception quality is obtained. Manifold learning is able to relatively well find an inner geometrical structure of an image in the low-dimensional manifold, which reflects a nonlinear manifold nature of the objects.

According to the visual perception characteristics of the human eyes in the manifold manner and a manifold learning theory with considering binocular rivalry characteristics, the present invention provides an objective assessment method for a stereoscopic image quality combined with manifold characteristics and binocular characteristics. In a training phase, the method obtains a best mapping matrix through manifold learning with an orthogonal locality preserving projection algorithm, for extracting the manifold characteristics of an image. In a quality testing phase, luminance components of a left viewpoint image and a right viewpoint image of both an original undistorted natural scene stereoscopic image and a distorted stereoscopic image are divided into image blocks, and a mean value of each image block is subtracted, so that gray vectors corresponding to all image blocks all have a zero mean value and a manifold characteristic similarity is accordingly calculated. A mean value of all image blocks is applied in calculating a luminance similarity. The manifold characteristic similarity represents a structural difference between two images, and the luminance similarity measures a luminance distortion of the distorted image. Finally, through the manifold characteristic similarity and the luminance similarity, respective overall visual quality of the left viewpoint image and the right viewpoint image of the distorted stereoscopic image are obtained. Considering an influence of a binocular rivalry on the stereoscopic image quality, weighted values respectively of the left viewpoint image and the right viewpoint image are calculated through local energy diagrams, so as to weight quality values respectively of the left viewpoint image and the right viewpoint image for obtaining a final quality value of the distorted stereoscopic image. The method provided by the present invention achieves a good effect on assessing symmetrically and asymmetrically distorted stereoscopic images through simulating the binocular rivalry characteristics with a binocular rivalry model.

According to a preferred embodiment of the present invention, the present invention provides an objective assessment method for a stereoscopic image quality combined with manifold characteristics and binocular characteristics, wherein an implementation block diagram thereof is showed in the figure, and the method comprises steps of:

①  selecting multiple undistorted natural scene plane images, and extracting a luminance component from each undistorted natural scene plane image;

then, dividing the luminance component of each undistorted natural scene plane image into image blocks which are not overlapping mutually and have a size of 8×8;

next, randomly selecting N image blocks from all the image blocks of the luminance components of all the undistorted natural scene plane images; adopting each selected image block as a training sample; and denoting an $i^{th}$ training sample as $x_i$; wherein: 5000≤N≤20000, and 1≤i≤N;

subsequently, forming a gray vector through arranging pixel values of all pixels in each training sample; and denoting a gray vector formed through arranging pixel values of all pixels in the $x_i$ as $x_i^{col}$, wherein: the $x_i^{col}$ has a dimensionality of 64×1; and, a value of a $1^{st}$ element to a $64^{th}$ element in the $x_i^{col}$ respectively correspond to the pixel value of each pixel in the $x_i$ in a line-by-line scanning manner;

afterwards, for each gray vector corresponding to each training sample, subtracting a mean value of values of all elements in the gray vector from a value of each element in the gray vector, so as to centralize the gray vector corresponding to each training sample; and denoting a gray vector obtained after centralizing the $x_i^{col}$ as $\hat{x}_i^{col}$; wherein: a value of a $1^{st}$ element in the $\hat{x}_i^{col}$ is equal to a value which is obtained through subtracting a mean value of values of all elements in the $x_i^{col}$ from the value of the $1^{st}$ element in the $x_i^{col}$; and so on, a value of a $64^{th}$ element in the $\hat{x}_i^{col}$ is equal to a value which is obtained through subtracting the mean value of the values of all the elements in the $x_i^{col}$ from the value of the $64^{th}$ element in the $x_i^{col}$; and finally, denoting a matrix formed by all obtained centralized gray vectors as X, $X=[\hat{x}_1^{col}, \hat{x}_2^{col}, \ldots, \hat{x}_N^{col}]$, wherein: the X has a dimensionality of 64×N; the $\hat{x}_1^{col}, \hat{x}_2^{col}, \ldots, \hat{x}_N^{col}$ respectively represent a gray vector obtained after centralizing a gray vector formed through arranging pixel values of all pixels in a $1^{st}$ training sample, a gray vector obtained after centralizing a gray vector formed through arranging pixel values of all pixels in a $2^{nd}$ training sample, ..., and a gray vector obtained after centralizing a gray vector formed through arranging pixel values of all pixels in an $N^{th}$ training sample; and a symbol "[ ]" is a vector representation symbol; wherein:

it is feasible that sizes of the multiple undistorted natural scene plane images are all same or different from each other, or sizes of part of the multiple undistorted natural scene plane images are same; the number of the undistorted natural scene plane images is embodied to be 10; a value range of the N is determined according to a large number of experiments; if a value of the N is too small (smaller than 5,000), namely the number of the image blocks is relatively small, a training accuracy is greatly affected; if the value of the N is too large (larger than 20,000), namely the number of the image blocks is relatively large, the training accuracy is increased little while a computation complexity is greatly increased; thus the value range of the N is 5000≤N≤20000, and it is embodied as N=20000 herein; and, because a gray image merely considers the luminance component of the image, the gray vector corresponding to each training sample has a length of 8×8=64;

② processing the X with dimensionality reduction and whitening through a principal component analysis (PCA), and denoting an obtained matrix after the dimensionality reduction and whitening as $X^W$, wherein: the $X^W$ has a dimensionality of M×N; the M is a set low dimensionality, 1<M<64, and it is embodied as M=8 herein; wherein:

according to the preferred embodiment of the present invention, the $X^W$ in the step ② is obtained through following steps of:

②-1, calculating a covariance matrix of the X, denoted as C, $$C = \frac{1}{N}(X \times X^T),$$

wherein: the C has a dimensionality of 64×64; and, the $X^T$ is a transposed matrix of the X;

②-2, processing the C with eigenvalue decomposition through a conventional technology, and decomposing the C into an eigenvalue diagonal matrix and an eigenvector matrix, respectively denoted as ψ and E, wherein: the ψ has a dimensionality of 64×64, $$\Psi = \begin{bmatrix} \Psi_1 & 0 & \cdots & 0 \\ 0 & \Psi_2 & \cdots & 0 \\ \cdots & \cdots & \cdots & \cdots \\ 0 & 0 & 0 & \Psi_{64} \end{bmatrix};$$

the $\psi_1$, the $\psi_2$, and the $\psi_{64}$ respectively represent a $1^{st}$ eigenvalue, a $2^{nd}$ eigenvalue, and a $64^{th}$ eigenvalue obtained through decomposing; the E has a dimensionality of 64×64, E=[$e_1$ $e_2$ ... $e_{64}$]; the $e_1$, the $e_2$, and the $e_{64}$ respectively represent a $1^{st}$ eigenvector, a $2^{nd}$ eigenvector, and a $64^{th}$ eigenvector obtained through decomposing; and, the $e_1$, the $e_2$, and the $e_{64}$ all have a dimensionality of 64×1;

②-3, calculating a whitened matrix, denoted as W, $$W = \Psi_{M \times 64}^{-\frac{1}{2}} \times E^T,$$

wherein: the W has a dimensionality of M×64;

$$\Psi_{M \times 64}^{-\frac{1}{2}} = \begin{bmatrix} 1/\sqrt{\Psi_1} & 0 & \cdots & 0 & \cdots & 0 \\ 0 & 1/\sqrt{\Psi_2} & \cdots & 0 & \cdots & 0 \\ \cdots & \cdots & \cdots & \cdots & \cdots & \cdots \\ 0 & 0 & \cdots & 1/\sqrt{\Psi_M} & \cdots & 0 \end{bmatrix};$$

the $\psi_M$ represents an $M^{th}$ eigenvalue obtained through decomposing; the M is the set low dimensionality, 1<M<64, and it is embodied as M=8 herein; and, the $E^T$ is a transposed matrix of the E; wherein:

the $\psi_{M \times 64}$ is a matrix formed by former M rows of the ψ, $$\Psi_{M \times 64} = \begin{bmatrix} \psi_1 & 0 & \cdots & 0 & \cdots & 0 \\ 0 & \psi_2 & \cdots & 0 & \cdots & 0 \\ \vdots & \vdots & \vdots & \vdots & \vdots & \vdots \\ 0 & 0 & \cdots & \psi_M & \cdots & 0 \end{bmatrix};$$

the M is the set low dimensionality; and, former eight rows of the ψ are selected in the experiment, namely former eight principal components are for training and the dimensionality of the X after the dimensionality reduction and whitening is decreased from 64 to 8; and ②-4, calculating the matrix $X^W$ obtained after the dimensionality reduction and whitening, wherein $X^W = W \times X$;

③ training N column vectors in the $X^W$ through a conventional orthogonal locality preserving projection (OLPP) algorithm, and obtaining a best mapping matrix of eight orthogonal bases of the $X^W$, denoted as $J^W$, wherein the $J^W$ has a dimensionality of 8×M; and after learning, converting the best mapping matrix from a whitened sample space into an original sample space; namely, according to the $J^W$ and the whitened matrix, calculating a best mapping matrix of the original sample space, denoted as J, $J = J^W \times W$, wherein: the J has a dimensionality of 8×64; the W represents the whitened matrix, the W has the dimensionality of M×64, and the W is obtained according to the step ②-1 to the step ②-3; and, according to the preferred embodiment of the present invention, the J is seen as a perception model of a human brain in a manifold manner for extracting manifold characteristics of the image blocks;

④ representing an original undistorted natural scene stereoscopic image having a width of W' and a height of H' by $I_{org}$; respectively denoting a left viewpoint image and a right viewpoint image of the $I_{org}$ as $I_{org}^L$ and $I_{org}^R$, and extracting luminance components respectively from the $I_{org}^L$ and the $I_{org}^R$; representing a distorted stereoscopic image of the $I_{org}$ after distortion by $I_{dis}$; adopting the $I_{dis}$ as a distorted stereoscopic image to be assessed; respectively denoting a left viewpoint image and a right viewpoint image of the $I_{dis}$ as $I_{dis}^L$ and $I_{dis}^R$, and extracting luminance components respectively from the $I_{dis}^L$ and the $I_{dis}^R$;

then, dividing the luminance components of the $I_{org}^L$, the $I_{org}^R$, the $I_{dis}^L$, and the $I_{dis}^R$ respectively into $$\left\lfloor \frac{W'}{8} \right\rfloor \times \left\lfloor \frac{H'}{8} \right\rfloor$$

image blocks which are not overlapping mutually and have a size of 8×8; denoting a $j^{th}$ image block in the luminance component of the $I_{org}^L$ as $x_j^{ref,L}$; denoting a $j^{th}$ image block in the luminance component of the $I_{org}^R$ as $x_j^{ref,R}$; denoting a $j^{th}$ image block in the luminance component of the $I_{dis}^L$ as $x_j^{dis,L}$; and denoting a $j^{th}$ image block in the luminance component of the $I_{dis}^R$ as $x_j^{dis,R}$; wherein a symbol "⌊ ⌋" is a floor symbol; 1≤j≤N'; and $$N' = \left\lfloor \frac{W'}{8} \right\rfloor \times \left\lfloor \frac{H'}{8} \right\rfloor;$$

next, forming a gray vector through arranging pixel values of all pixels in each image block of the luminance component of the $I_{org}^L$, and denoting a gray vector formed through arranging pixel values of all pixels in the $x_j^{ref,L}$ as $x_j^{ref,L,col}$; forming a gray vector through arranging pixel values of all pixels in each image block of the luminance component of the $I_{org}^R$, and denoting a gray vector formed through arranging pixel values of all pixels in the $x_j^{ref,R}$ as $x_j^{ref,R,col}$; forming a gray vector through arranging pixel values of all pixels in each image block of the luminance component of the $I_{dis}^L$, and denoting a gray vector formed through arranging pixel values of all pixels in the $x_j^{dis,L}$ as $x_j^{dis,L,col}$; forming a gray vector through arranging pixel values of all pixels in each image block of the luminance component of the $I_{dis}^R$, and denoting a gray vector formed through arranging pixel values of all pixels in the $x_j^{dis,R}$ as $x_j^{dis,R,col}$; wherein: the $x_j^{ref,L,col}$, the $x_j^{ref,R,col}$, the $x_j^{dis,L,col}$, and the $x_j^{dis,R,col}$ all have a dimensionality of 64×1; a value of a $1^{st}$ element to a $64^{th}$ element in the $x_j^{ref,L,col}$ respectively correspond to the pixel value of each pixel in the $x_j^{ref,L}$ in the line-by-line scanning manner; a value of a $1^{st}$ element to a $64^{th}$ element in the $x_j^{ref,R,col}$ respectively correspond to the pixel value of each pixel in the $x_j^{ref,R}$ in the line-by-line scanning manner; a value of $1^{st}$ element to a $64^{th}$ element in the $x_j^{dis,L,col}$ respectively correspond to the pixel value of each pixel in the $x_j^{dis,L}$ in the line-by-line scanning manner; and, a value of a $1^{st}$ element to a $64^{th}$ element in the $x_j^{dis,R,col}$ respectively correspond to the pixel value of each pixel in the $x_j^{dis,R}$ in the line-by-line scanning manner;

afterwards, for each gray vector corresponding to each image block of the luminance component of the $I_{org}^L$, subtracting a mean value of values of all elements in the gray vector from a value of each element in the gray vector, so as to centralize the gray vector corresponding to each image block of the luminance component of the $I_{org}^L$, and denoting a gray vector obtained after centralizing the $x_j^{ref,L,col}$ as $\hat{x}_j^{ref,L,col}$; for each gray vector corresponding to each image block of the luminance component of the $I_{org}^R$, subtracting a mean value of values of all elements in the gray vector from a value of each element in the gray vector, so as to centralize the gray vector corresponding to each image block of the luminance component of the $I_{org}^R$, and denoting a gray vector obtained after centralizing the $x_j^{ref,R,col}$ as $\hat{x}_j^{ref,R,col}$; for each gray vector corresponding to each image block of the luminance component of the $I_{dis}^L$, subtracting a mean value of values of all elements in the gray vector from a value of each element in the gray vector, so as to centralize the gray vector corresponding to each image block of the luminance component of the $I_{dis}^L$, and denoting a gray vector obtained after centralizing the $x_j^{dis,L,col}$ as $\hat{x}_j^{dis,L,col}$; for each gray vector corresponding to each image block of the luminance component of the $I_{dis}^R$, subtracting a mean value of values of all elements in the gray vector from a value of each element in the gray vector, so as to centralize the gray vector corresponding to each image block of the luminance component of the $I_{dis}^R$, and denoting a gray vector obtained after centralizing the $x_j^{dis,R,col}$ as $\hat{x}_j^{dis,R,col}$; and finally, denoting a matrix formed by all obtained centralized gray vectors corresponding to the luminance component of the $I_{org}^L$ as $X^{ref,L}$, $X^{ref,L}=[\hat{x}_1^{ref,L,col}, \hat{x}_2^{ref,L,col}, \ldots, \hat{x}_{N'}^{ref,L,col}]$; denoting a matrix formed by all obtained centralized gray vectors corresponding to the luminance component of the $I_{org}^R$ as $X^{ref,R}$, $X^{ref,R}=[\hat{x}_1^{ref,R,col}, \hat{x}_2^{ref,R,col}, \ldots, \hat{x}_{N'}^{ref,R,col}]$; denoting a matrix formed by all obtained centralized gray vectors corresponding to the luminance component of the $I_{dis}^L$ as $X^{dis,L}$, $X^{dis,L}=[\hat{x}_1^{dis,L,col}, \hat{x}_2^{dis,L,col}, \ldots, \hat{x}_{N'}^{dis,L,col}]$; and, denoting a matrix formed by all obtained centralized gray vectors corresponding to the luminance component of the $I_{dis}^R$ as $X^{dis,R}$, $X^{dis,R}=[\hat{x}_1^{dis,R,col}, \hat{x}_2^{dis,R,col}, \ldots, \hat{x}_{N'}^{dis,L,col}]$; wherein: the $X^{ref,L}$, the $X^{ref,R}$, the $X^{dis,L}$, and the $X^{dis,R}$ all have a dimensionality of 64×N'; the $\hat{x}_1^{ref,L,col}, \hat{x}_2^{ref,L,col}, \ldots, \hat{x}_{N'}^{ref,L,col}$ respectively represent a gray vector obtained after centralizing a gray vector formed through arranging pixel values of all pixels in a 1$^{st}$ image block of the luminance component of the $I_{org}^L$, a gray vector obtained after centralizing a gray vector formed through arranging pixel values of all pixels in a 2$^{nd}$ image block of the luminance component of the $I_{org}^L$, ..., and a gray vector obtained after centralizing a gray vector formed through arranging pixel values of all pixels in an N'$^{th}$ image block of the luminance component of the $I_{org}^L$; the $\hat{x}_1^{ref,R,col}, \hat{x}_2^{ref,R,col}, \ldots, \hat{x}_{N'}^{ref,R,col}$ respectively represent a gray vector obtained after centralizing a gray vector formed through arranging pixel values of all pixels in a 1$^{st}$ image block of the luminance component of the $I_{org}^R$, a gray vector obtained after centralizing a gray vector formed through arranging pixel values of all pixels in a 2$^{nd}$ image block of the luminance component of the $I_{org}^R$, ..., and a gray vector obtained after centralizing a gray vector formed through arranging pixel values of all pixels in an N'$^{th}$ image block of the luminance component of the $I_{org}^R$; the $\hat{x}_1^{dis,L,col}, \hat{x}_2^{dis,L,col}, \ldots, \hat{x}_{N'}^{dis,L,col}$ respectively represent a gray vector obtained after centralizing a gray vector formed through arranging pixel values of all pixels in a 1$^{st}$ image block of the luminance component of the $I_{dis}^L$, a gray vector obtained after centralizing a gray vector formed through arranging pixel values of all pixels in a 2$^{nd}$ image block of the luminance component of the $I_{dis}^L$, ..., and a gray vector obtained after centralizing a gray vector formed through arranging pixel values of all pixels in an N'$^{th}$ image block of the luminance component of the $I_{dis}^L$; the $\hat{x}_1^{dis,R,col}, \hat{x}_2^{dis,R,col}, \ldots, \hat{x}_{N'}^{dis,R,col}$ respectively represent a gray vector obtained after centralizing a gray vector formed through arranging pixel values of all pixels in a 1$^{st}$ image block of the luminance component of the $I_{dis}^R$, a gray vector obtained after centralizing a gray vector formed through arranging pixel values of all pixels in a 2$^{nd}$ image block of the luminance component of the $I_{dis}^R$, ..., and a gray vector obtained after centralizing a gray vector formed through arranging pixel values of all pixels in an N'$^{th}$ image block of the luminance component of the $I_{dis}^R$; and the symbol "[ ]" is the vector representation symbol;

⑤ because the obtained image block after subtracting the mean value of all the elements in the gray vector corresponding to each image block from the value of each element comprises contrast information and structural information and thus is called a structural block, calculating a structural difference between each column vector in the $X^{ref,L}$ and a corresponding column vector in the $X^{dis,L}$ through an absolute variance error (AVE), and denoting a structural difference between the $\hat{x}_j^{ref,L,col}$ and the $\hat{x}_j^{dis,L,col}$ as $AVE(\hat{x}_j^{ref,L,col}, \hat{x}_j^{dis,L,col})$; calculating a structural difference between each column vector in the $X^{ref,R}$ and a corresponding column vector in the $X^{dis,R}$, and denoting a structural difference between the $\hat{x}_j^{ref,R,col}$ and the $\hat{x}_j^{dis,R,col}$ as $AVE(\hat{x}_j^{ref,R,col}, \hat{x}_j^{dis,R,col})$;

then, forming a vector having a dimensionality of 1×N' through orderly arranging N' structural differences corresponding to the $X^{ref,L}$ and the $X^{dis,L}$, denoted as $v^L$; and, forming a vector having a dimensionality of 1×N' through orderly arranging N' structural differences corresponding to the $X^{ref,R}$ and the $X^{dis,R}$, denoted as $v^R$; wherein: a value of a j$^{th}$ element in the $v^L$ is $v_j^L$, $v_j^L=AVE(\hat{x}_j^{ref,L,col},\hat{x}_j^{dis,L,col})$; and a value of a j$^{th}$ element in the $v^R$ is $v_j^R$, $v_j^R=AVE(\hat{x}_j^{ref,R,col},\hat{x}_j^{dis,R,col})$; and obtaining an undistorted left viewpoint image block set, a distorted left viewpoint image block set, an undistorted right viewpoint image block set, and a distorted right viewpoint image block set, comprising steps of:

a1), setting a left viewpoint image block selection threshold $TH_1$ and a right viewpoint image block selection threshold $TH_2$;

a2), extracting all elements having a value larger than or equal to the $TH_1$ from the $v^L$, and extracting all elements having a value larger than or equal to the $TH_2$ from the $v^R$; and a3), adopting a set formed by the image blocks of the luminance component of the $I_{org}^L$ corresponding to the elements extracted from the $v^L$ as the undistorted left viewpoint image block set, denoted as $Y^{ref,L}$, $Y^{ref,L}=\{x_j^{ref,L}|AVE(\hat{x}_j^{ref,L,col},\hat{x}_j^{dis,L,col}) \geq TH_1, 1 \leq j \leq N'\}$; adopting a set formed by the image blocks of the luminance component of the $I_{dis}^L$ corresponding to the elements extracted from the $v^L$ as the distorted left viewpoint image block set, denoted as $Y^{dis,L}$, $Y^{dis,L}=\{x_j^{dis,L}|AVE(\hat{x}_j^{ref,L,col},\hat{x}_j^{dis,L,col}) \geq TH_1, 1 \leq j \leq N'\}$; adopting a set formed by the image blocks of the luminance component of the $I_{org}^R$ corresponding to the elements extracted from the $v^R$ as the undistorted right viewpoint image block set, denoted as $Y^{ref,R}$, $Y^{ref,R}=\{x_j^{ref,R}|AVE(\hat{x}_j^{ref,R,col},\hat{x}_j^{dis,R,col}) \geq TH_2, 1 \leq j \leq N'\}$; and, adopting a set formed by the image blocks of the luminance component of the $I_{dis}^R$ corresponding to the elements extracted from the $v^R$ as the distorted right viewpoint image block set, denoted as $Y^{dis,R}$, $Y^{dis,R}=\{x_j^{dis,R}|AVE(\hat{x}_j^{ref,R,col}, \hat{x}_j^{dis,R,col})\geq TH_2, 1\leq j\leq N'\}$; wherein:

according to the preferred embodiment of the present invention, in the step ⑤, $$AVE(\hat{x}_j^{ref,L,col}, \hat{x}_j^{dis,L,col}) = \left|\sum_{g=1}^{64}(\hat{x}_j^{ref,L,col}(g))^2 - \sum_{g=1}^{64}(\hat{x}_j^{dis,L,col}(g))^2\right|,$$

and $$AVE(\hat{x}_j^{ref,R,col}, \hat{x}_j^{dis,R,col}) = \left|\sum_{g=1}^{64}(\hat{x}_j^{ref,R,col}(g))^2 - \sum_{g=1}^{64}(\hat{x}_j^{dis,R,col}(g))^2\right|,$$

wherein: a symbol "| |" is an absolute value symbol; the $\hat{x}_j^{ref,L,col}(g)$ represents a value of a $g^{th}$ element in the $\hat{x}_j^{ref,L,col}$; the $\hat{x}_j^{dis,L,col}(g)$ represents a value of a $g^{th}$ element in the $\hat{x}_j^{dis,L,col}$; the $\hat{x}_j^{ref,R,col}(g)$ represents a value of a $g^{th}$ element in the $\hat{x}_j^{dis,L,col}$; the $\hat{x}_j^{ref,R,col}(g)$ represents a value of a $g^{th}$ element in the $\hat{x}_j^{ref,R,col}$; and, the $\hat{x}_j^{dis,R,col}(g)$ represents a value of a $g^{th}$ element in the $\hat{x}_j^{dis,R,col}$; and according to the preferred embodiment of the present invention, in the step a1) of the step ⑤, $TH_1$=median($v^L$), and $TH_2$=median($v^R$); wherein: the median ( ) is a mid-value selection function; the median($v^L$) is to find a mid-value of values of all elements in the $v^L$; and the median($v^R$) is to find a mid-value of values of all elements in the $v^R$;

⑥ calculating a manifold characteristic vector of each image block in the $Y^{ref,L}$, and denoting a manifold characteristic vector of a $t^{th}$ image block in the $Y^{ref,L}$ as $r_t^{ref,L}$, $r_t^{ref,L}=J\times\hat{x}_t^{ref,L,col}$; calculating a manifold characteristic vector of each image block in the $Y^{dis,L}$, and denoting a manifold characteristic vector of a $t^{th}$ image block in the $Y^{dis,L}$ as $d_t^{dis,L}$, $d_t^{dis,L}=J\times\hat{x}_t^{dis,L,col}$; calculating a manifold characteristic vector of each image block in the $Y^{ref,R}$, and denoting a manifold characteristic vector of a $t'^{th}$ image block in the $Y^{ref,R}$ as $r_{t'}^{ref,R}$, $r_{t'}^{ref,R}=J\times\hat{x}_{t'}^{ref,R,col}$; calculating a manifold characteristic vector of each image block in the $Y^{dis,R}$, and denoting a manifold characteristic vector of a $t'^{th}$ image block in the $Y^{dis,R}$ as $d_{t'}^{dis,R}$, $d_{t'}^{dis,R}=J\times\hat{x}_{t'}^{dis,R,col}$; wherein: $1\leq t\leq K$, the K represents a total number of the image blocks in the $Y^{ref,L}$, namely a total number of the image blocks in the $Y^{dis,L}$; $1\leq t'\leq K'$, the K' represents a total number of the image blocks in the $Y^{ref,R}$, namely a total number of the image blocks in the $Y^{dis,R}$; the $r_t^{ref,L}$, the $d_t^{dis,L}$, the $r_{t'}^{ref,R}$, and the $d_{t'}^{dis,R}$ all have a dimensionality of 8×1; the $\hat{x}_t^{ref,L,col}$ represents a gray vector obtained after centralizing a gray vector formed through arranging pixel values of all pixels in the $t^{th}$ image block of the $Y^{ref,L}$; the $\hat{x}_t^{dis,L,col}$ represents a gray vector obtained after centralizing a gray vector formed through arranging pixel values of all pixels in the $t^{th}$ image block of the $Y^{dis,L}$; the $\hat{x}_{t'}^{ref,R,col}$ represents a gray vector obtained after centralizing a gray vector formed through arranging pixel values of all pixels in the $t'^{th}$ image block of the $Y^{ref,R}$; and, the $\hat{x}_{t'}^{dis,R,col}$ represents a gray vector obtained after centralizing a gray vector formed through arranging pixel values of all pixels in the $t'^{th}$ image block of the $Y^{dis,R}$;

then, forming a matrix by the manifold characteristic vectors of all the image blocks in the $Y^{ref,L}$, denoted as $R^L$; forming a matrix by the manifold characteristic vectors of all the image blocks in the $Y^{dis,L}$, denoted as $D^L$; forming a matrix by the manifold characteristic vectors of all the image blocks in the $Y^{ref,R}$, denoted as $R^R$; and, forming a matrix by the manifold characteristic vectors of all the image blocks in the $Y^{dis,R}$, denoted as $D^R$; wherein: the $R^L$ and the $D^L$ both have a dimensionality of 8×K; the $R^R$ and the $D^R$ both have a dimensionality of 8×K'; a $t^{th}$ column vector in the $R^L$ is the $r_t^{ref,L}$; a $t^{th}$ column vector in the $D^L$ is the $d_t^{dis,L}$; a $t'^{th}$ column vector in the $R^R$ is the $r_{t'}^{ref,R}$; and a $t'^{th}$ column vector in the $D^R$ is the $d_{t'}^{dis,R}$; and calculating a manifold characteristic similarity between the luminance component of the $I_{org}^L$ and the luminance component of the $I_{dis}^L$, denoted as $MFS_1^L$, $$MFS_1^L = \frac{1}{8\times K}\sum_{m=1}^{8}\sum_{t=1}^{K}\frac{2R_{m,t}^L D_{m,t}^L + C_1}{(R_{m,t}^L)^2 + (D_{m,t}^L)^2 + C_1};$$

and, calculating a manifold characteristic similarity between the luminance component of the $I_{org}^R$ and the luminance component of the $I_{dis}^R$, denoted as $MFS_1^R$, $$MFS_1^R = \frac{1}{8\times K'}\sum_{m=1}^{8}\sum_{t'=1}^{K'}\frac{2R_{m,t'}^R D_{m,t'}^R + C_1}{(R_{m,t'}^R)^2 + (D_{m,t'}^R)^2 + C_1};$$

wherein: the $R_{m,t}^L$ represents a value of an element in a $m^{th}$ row and a $t^{th}$ column of the $R^L$; the $D_{m,t}^L$ represents a value of an element in a $m^{th}$ row and a $t^{th}$ column of the $D^L$; the $R_{m,t'}^R$ represents a value of an element in a $m^{th}$ row and a $t'^{th}$ column of the $R^R$; the $D_{m,t'}^R$ represents a value of an element in a $m^{th}$ row and a $t'^{th}$ column of the $D^R$; the $C_1$ is a small constant for guaranteeing a result stability, and it is embodied as $C_1$=0.09 herein;

⑦ calculating a luminance similarity between the luminance component of the $I_{org}^L$ and the luminance component of the $I_{dis}^L$, denoted as $MFS_2^L$, $$MFS_2^L = \frac{\sum_{t=1}^{K}(\mu_t^{ref,L}-\bar{\mu}^{ref,L})\times(\mu_t^{dis,L}-\bar{\mu}^{dis,L}) + C_2}{\sqrt{\sum_{t=1}^{K}(\mu_t^{ref,L}-\bar{\mu}^{ref,L})^2\times\sum_{t=1}^{K}(\mu_t^{dis,L}-\bar{\mu}^{dis,L})^2} + C_2};$$

and, calculating a luminance similarity between the luminance component of the $I_{org}^R$ and the luminance component of the $I_{dis}^R$, denoted as $MFS_2^R$, $$MFS_2^R = \frac{\sum_{t'=1}^{K'}(\mu_{t'}^{ref,R}-\bar{\mu}^{ref,R})\times(\mu_{t'}^{dis,R}-\bar{\mu}^{dis,R}) + C_2}{\sqrt{\sum_{t'=1}^{K'}(\mu_{t'}^{ref,R}-\bar{\mu}^{ref,R})^2\times\sum_{t'=1}^{K'}(\mu_{t'}^{dis,R}-\bar{\mu}^{dis,R})^2} + C_2};$$

wherein: the $\mu_t^{ref,L}$ represents a mean value of the pixel values of all the pixels in the $t^{th}$ image block of the $Y^{ref,L}$, $$\overline{\mu}^{ref,L} = \frac{\sum_{t=1}^{K} \mu_t^{ref,L}}{K};$$

the $\mu_t^{dis,L}$ represents a mean value of the pixel values of all the pixels in the $t^{th}$ image block of the $Y^{dis,L}$, $$\overline{\mu}^{dis,L} = \frac{\sum_{t=1}^{K} \mu_t^{dis,L}}{K};$$

the $\mu_{t'}^{ref,R}$ represents a mean value of the pixel values of all the pixels in the $t'^{th}$ image block of the $Y^{ref,R}$, $$\overline{\mu}^{ref,R} = \frac{\sum_{t'=1}^{K'} \mu_{t'}^{ref,R}}{K'};$$

the $\mu_{t'}^{dis,R}$ represents a mean value of the pixel values of all the pixels in the $t'^{th}$ image block of the $Y^{dis,R}$, $$\overline{\mu}^{dis,R} = \frac{\sum_{t'=1}^{K'} \mu_{t'}^{dis,R}}{K'};$$

the $C_2$ is a small constant for guaranteeing a result stability, and it is embodied as $C_2=0.001$ herein;

⑧ processing the $MFS_1^L$ and the $MFS_2^L$ with power exponent weighting, so as to obtain a quality score of the $I_{dis}^L$, denoted as $MFS^L$, $MFS^L=(MFS_1^L)^\alpha \times (MFS_2^L)^\beta$; and, processing the $MFS_1^R$ and the $MFS_2^R$ with the power exponent weighting, so as to obtain a quality score of the $I_{dis}^R$, denoted as $MFS^R$, $MFS^R=(MFS_1^R)^\alpha \times (MFS_2^R)^\beta$; wherein: the $\alpha$ is for adjusting a relative importance of the $MFS_1^L$ and the $MFS_1^R$; the $\beta$ is for adjusting a relative importance of the $MFS_2^L$ and the $MFS_2^R$; $\alpha+\beta=1$; and, it is embodied as $\alpha=0.25$ and $\beta=0.75$ herein; and ⑨ obtaining a weighted value of the $I_{dis}^L$ and a weighted value of the $I_{dis}^R$ through a binocular rivalry model, respectively denoted as $\omega^L$ and $\omega^R$; weighting the $MFS^L$ through the $\omega^L$, and weighting the $MFS^R$ through the $\omega^R$, so as to obtain a quality value of the $I_{dis}$, denoted as Q, $Q=\omega^L \times MFS^L + \omega^R \times MFS^R$; wherein: the $\omega^L$ is for adjusting a relative importance of the $MFS^L$; the $\omega^R$ is for adjusting a relative importance of the $MFS^R$; and, $\omega^L+\omega^R=1$; wherein:

according to the preferred embodiment of the present invention, in the step ⑨, the $\omega^L$ and the $\omega^R$ are obtained through following steps of:

⑨-1, sliding in the $I_{org}^L$ pixel by pixel with a sliding window having a size of Q×Q, dividing the $$I_{org}^L \text{ into } \left(W' - \frac{Q-1}{2}\right) \times \left(H' - \frac{Q-1}{2}\right)$$

image blocks which are overlapping and have a size of Q×Q, and denoting a $p^{th}$ image block in the $I_{org}^L$ as $B_p^{ref,L}$; sliding in the $I_{dis}^L$ pixel by pixel with the sliding window having the size of Q×Q, dividing the $$I_{dis}^L \text{ into } \left(W' - \frac{Q-1}{2}\right) \times \left(H' - \frac{Q-1}{2}\right)$$

image blocks which are overlapping and have a size of Q×Q, and denoting a $p^{th}$ image block in the $I_{dis}^L$ as $B_p^{dis,L}$; sliding in the $I_{org}^R$ pixel by pixel with the sliding window having the size of Q×Q, dividing the $$I_{org}^R \text{ into } \left(W' - \frac{Q-1}{2}\right) \times \left(H' - \frac{Q-1}{2}\right)$$

image blocks which are overlapping and have a size of Q×Q, and denoting a $p^{th}$ image block in the $I_{org}^R$ as $B_p^{ref,R}$; sliding in the $I_{dis}^R$ pixel by pixel with the sliding window having the size of Q×Q, dividing the $$I_{dis}^R \text{ into } \left(W' - \frac{Q-1}{2}\right) \times \left(H' - \frac{Q-1}{2}\right)$$

image blocks which are overlapping and have a size of Q×Q, and denoting a $p^{th}$ image block in the $I_{dis}^R$ as $B_p^{dis,R}$; wherein: $9 \leq Q \leq 37$; the Q is an odd number, and it is embodied as Q=33 herein; and $$1 \leq p \leq \left(W' - \frac{Q-1}{2}\right) \times \left(H' - \frac{Q-1}{2}\right);$$

⑨-2, adopting a Gaussian low-pass filtering function, and arranging a size of a required convolution mask to be Q×Q and a standard deviation to be $\zeta$, so as to obtain a convolution mask, wherein $3 \leq \zeta \leq 6$ and it is embodied as $\zeta=4.5$ herein; and, normalizing a value of each element in the convolution mask, so as to obtain a normalized convolution mask; wherein: a normalized value of each element in the convolution mask is obtained through dividing the value of each element in the convolution mask by a sum of values of all elements in the convolution mask;

⑨-3, through the normalized convolution mask, obtaining a weighted mean value of pixel values of all pixels in each image block of the $I_{org}^L$, and denoting a weighted mean value of pixel values of all pixels in the $B_p^{ref,L}$ as $\overline{b}_p^{ref,L}$, $$\overline{b}_p^{ref,L} = \frac{\sum_{u=1}^{Q} \sum_{v=1}^{Q} Mode(u,v) \times B_p^{ref,L}(u,v)}{Q \times Q};$$

through the normalized convolution mask, obtaining a weighted mean value of pixel values of all pixels in each image block of the $I_{dis}^L$, and denoting a weighted mean value of pixel values of all pixels in the $B_p^{dis,L}$ as $\overline{b}_p^{dis,L}$, $$\overline{b}_p^{dis,L} = \frac{\sum_{u=1}^{Q} \sum_{v=1}^{Q} Mode(u,v) \times B_p^{dis,L}(u,v)}{Q \times Q};$$

through the normalized convolution mask, obtaining a weighted mean value of pixel values of all pixels in each image block of the $I_{org}^R$, and denoting a weighted mean value of pixel values of all pixels in the $B_p^{ref,R}$ as $\bar{b}_p^{ref,R}$, $$\bar{b}_p^{ref,R} = \frac{\sum_{u=1}^{Q}\sum_{v=1}^{Q} Mode(u,v) \times B_p^{ref,R}(u,v)}{Q \times Q};$$

through the normalized convolution mask, obtaining a weighted mean value of pixel values of all pixels in each image block of the $I_{dis}^R$, and denoting a weighted mean value of pixel values of all pixels in the $B_p^{dis,R}$ as $\bar{b}_p^{dis,R}$, $$\bar{b}_p^{dis,R} = \frac{\sum_{u=1}^{Q}\sum_{v=1}^{Q} Mode(u,v) \times B_p^{dis,R}(u,v)}{Q \times Q};$$

wherein: $1 \leq u \leq Q$, $1 \leq v \leq Q$; the $Mode(u,v)$ represents a value of an element having a subscript of $(u,v)$ in the normalized convolution mask; the $B_p^{ref,L}(u,v)$ represents a pixel value of a pixel having coordinates of $(u,v)$ in the $B_p^{ref,L}$; the $B_p^{dis,L}(u,v)$ represents a pixel value of a pixel having coordinates of $(u,v)$ in the $B_p^{dis,L}$; the $B_p^{ref,R}(u,v)$ represents a pixel value of a pixel having coordinates of $(u,v)$ in the $B_p^{ref,R}$; and, the $B_p^{dis,R}(u,v)$ represents a pixel value of a pixel having coordinates of $(u,v)$ in the $B_p^{dis,R}$;

⑨-4, according to the weighted mean value of the pixel values of all the pixels in each image block of the $I_{org}^L$, calculating a variance of the pixel values of all the pixels in each image block of the $I_{org}^L$ to serve as a variance energy; according to the weighted mean value of the pixel values of all the pixels in each image block of the $I_{dis}^L$, calculating a variance of the pixel values of all the pixels in each image block of the $I_{dis}^L$ to serve as a variance energy; according to the weighted mean value of the pixel values of all the pixels in each image block of the $I_{org}^R$, calculating a variance of the pixel values of all the pixels in each image block of the $I_{org}^R$ to serve as a variance energy; and, according to the weighted mean value of the pixel values of all the pixels in each image block of the $I_{dis}^R$, calculating a variance of the pixel values of all the pixels in each image block of the $I_{dis}^R$ to serve as a variance energy;

⑨-5, according to the variance energy corresponding to each image block in the $I_{org}^L$, obtaining an energy diagram of the $I_{org}^L$, denoted as $E^{ref,L}$; according to the variance energy corresponding to each image block in the $I_{dis}^L$, obtaining an energy diagram of the $I_{dis}^L$, denoted as $E^{dis,L}$; according to the variance energy corresponding to each image block in the $I_{org}^R$, obtaining an energy diagram of the $I_{org}^R$, denoted as $E^{ref,R}$; and, according to the variance energy corresponding to each image block in the $I_{dis}^R$, obtaining an energy diagram of the $I_{dis}^R$, denoted as $E^{dis,R}$; wherein: the $E^{ref,L}$, the $E^{dis,L}$, the $E^{ref,R}$, and the $E^{dis,R}$ all have a width of $$W' - \frac{Q-1}{2}$$

and a height of $$H' - \frac{Q-1}{2};$$

a pixel value $E^{ref,L}(p)$ of a $p^{th}$ pixel in the $E^{ref,L}$ is equal to a variance energy corresponding to a $p^{th}$ image block in the $I_{org}^L$; a pixel value $E^{dis,L}(p)$ of a $p^{th}$ pixel in the $E^{dis,L}$ is equal to a variance energy corresponding to a $p^{th}$ image block in the $I_{dis}^L$; a pixel value $E^{ref,R}(p)$ of a $p^{th}$ pixel in the $E^{ref,R}$ is equal to a variance energy corresponding to a $p^{th}$ image block in the $I_{org}^R$; and, a pixel value $E^{dis,R}(p)$ of a $p^{th}$ pixel in the $E^{dis,R}$ is equal to a variance energy corresponding to a $p^{th}$ image block in the $I_{dis}^R$;

⑨-6, calculating local energy ratio diagrams respectively of the left viewpoint image and the right viewpoint image based on principles that: because the reference stereoscopic image is the undistorted stereoscopic image and binocular fusion is dominant, when a viewpoint image in the left viewpoint and the right viewpoint has distortions at some spatial positions, the distortions may affect a structural consistency of the left viewpoint image and the right viewpoint image, causing binocular rivalry to be dominant; and, as a result, one viewpoint is able to be dominant at any time; comprising steps of:

calculating the local energy ratio diagram of the left viewpoint image, denoted as $Ratio^L$; denoting a pixel value of a $p^{th}$ pixel in the $Ratio^L$ as $Ratio^L(p)$, $$Ratio^L(p) = \frac{E^{dis,L}(p)}{E^{ref,L}(p)};$$

calculating the local energy ratio diagram of the right viewpoint image, denoted as $Ratio^R$; and, denoting a pixel value of a $p^{th}$ pixel in the $Ratio^R$ as $Ratio^R(p)$, $$Ratio^R(p) = \frac{E^{dis,R}(p)}{E^{ref,R}(p)};$$

wherein: the $Ratio^L$ and the $Ratio^R$ both have a width of $$W' - \frac{Q-1}{2}$$

and a height of $$H' - \frac{Q-1}{2};$$

wherein:
the local energy ratio diagram provides useful local information, which is applicable in predicting an image quality of the stereoscopic image combined with a quality of two single-viewpoint images; and ⑨-7, calculating the $\omega^L$, $$\omega^L = \frac{(g^L)^2}{(g^L)^2 + (g^R)^2};$$

and, calculating the $\omega^R$, $$\omega^R = \frac{(g^R)^2}{(g^L)^2 + (g^R)^2};$$

wherein:

$$g^L = \frac{\sum_{p=1}^{\left(W'-\frac{Q-1}{2}\right)\times\left(H'-\frac{Q-1}{2}\right)} E^{dis,L}(p) \times Ratio^L(p)}{\sum_{p=1}^{\left(W'-\frac{Q-1}{2}\right)\times\left(H'-\frac{Q-1}{2}\right)} E^{dis,L}(p)};$$

and $$g^R = \frac{\sum_{p=1}^{\left(W'-\frac{Q-1}{2}\right)\times\left(H'-\frac{Q-1}{2}\right)} E^{dis,R}(p) \times Ratio^R(p)}{\sum_{p=1}^{\left(W'-\frac{Q-1}{2}\right)\times\left(H'-\frac{Q-1}{2}\right)} E^{dis,R}(p)}.$$

In order to further illustrate feasibility and effectiveness of the method provided by the present invention, the method is tested.

The method is tested and compared on three open test image databases. The three test image databases are respectively an NBU stereoscopic image database, a LIVE I stereoscopic image database, and a LIVE II stereoscopic image database. The NBU stereoscopic image database totally comprises twelve original stereoscopic images and three hundred and twelve symmetrically distorted stereoscopic images obtained through distorting the twelve original stereoscopic images, and the number of distortion types is five, respectively a JPEG distortion, a JP2K distortion, a Gblur distortion, a WN distortion, and an H.264 distortion. The LIVE I stereoscopic image database totally comprises twenty original stereoscopic images and three hundred and sixty-five symmetrically distorted stereoscopic images obtained through distorting the twenty original stereoscopic images, and the number of distortion types is five, respectively the JPEG distortion, the JP2K distortion, the Gblur distortion, the WN distortion, and an FF distortion. The LIVE II stereoscopic image database totally comprises eight original stereoscopic images and three hundred and sixty symmetrically and asymmetrically distorted stereoscopic images obtained through distorting the eight original stereoscopic images, and the distortion types thereof are the same as the distortion types of the LIVE I stereoscopic image database.

A subjective score, such as a mean opinion score (MOS) and a differential mean opinion score (DMOS), is given to each distorted stereoscopic image in each above stereoscopic image database. A final algorithm performance verification is made based on comparing the subjective score with an objective assessment result for an image quality assessment algorithm.

Three common assessment indexes are adopted, and, according to a standard verification method provided by a Phase I/II video quality expert group (VQEG), an assessment performance of the image quality objective assessment method is obtained. A Spearman rank order correlation coefficient (SROCC) is adopted for assessing a prediction monotonicity of the method provided by the present invention. A Pearson linear correlation coefficient (PLCC) and a root mean squared error (RMSE) are adopted for assessing an accuracy of the method provided by the present invention. During obtaining the PLCC, a five-parameter nonlinear mapping function is adopted for nonlinear fitting.

The method provided by the present invention is compared with other five representative image quality assessment methods. The five representative image quality assessment methods are respectively an FI-PSNR method, an FI-SSIM method, an FI-MS-SSIM method, an FI-VIF method, and an FI-UQI method.

Ten undistorted stereoscopic images in a TOY image database are adopted, twenty thousand image blocks are randomly selected for training to obtain the best mapping matrix J, and then the best mapping matrix J is for a subsequent image quality assessment. Table 1 shows values of three predictive performance indexes, respectively the SROCC, the PLCC and the RMSE, of the method provided by the present invention, the FI-PSNR method, the FI-SSIM method, the FI-MS-SSIM method, the FI-VIF method, and the FI-UQI method on the three stereoscopic image databases. In Table 1, the image quality objective assessment method which has the best performance is marked in bold type. It is seen from Table 1 that the method provided by the present invention has good performance on all of the three stereoscopic image databases. Firstly, on the NBU and LIVE I stereoscopic image databases, the method provided by the present invention has the best performance, better than all the other image quality objective assessment methods. Secondly, on the LIVE II stereoscopic image database, the method provided by the present invention has the performance significantly better than all the other image quality objective assessment methods. Thus, on the whole, compared with the other image quality objective assessment methods, the quality value of the distorted stereoscopic image obtained by the method of the present invention is nearer to the subjective assessment.

In order to more comprehensively assess the ability of the image quality objective assessment method on predicting an image quality reduction caused by a specific distortion, the assessment performance of the method provided by the present invention and other image quality objective assessment methods are tested under the specific distortion, and the PLCC and the SROCC serve as the performance indexes. Table 2 shows values of the predictive performance index PLCC of the method provided by the present invention, the FI-PSNR method, the FI-SSIM method, the FI-MS-SSIM method, the FI-VIF method, and the FI-UQI method on fifteen specific groups of distortion sub-databases in the three stereoscopic image databases. Table 3 shows values of the predictive performance index SROCC of the method provided by the present invention, the FI-PSNR method, the FI-SSIM method, the FI-MS-SSIM method, the FI-VIF method, and the FI-UQI method on the fifteen specific groups of the distortion sub-databases in the three stereoscopic image databases. In Table 2, the image quality assessment method has the best PLCC value under each distortion type of each stereoscopic image database is marked in bold type. In Table 3, the image quality assessment method has the best SROCC value under each distortion type of each stereoscopic image database is marked in bold type. It is seen from Table 2 and Table 3 that: the number of the method provided by the present invention having the best PLCC and SROCC values in the three stereoscopic image databases is most. Thus, it is concluded that: on the whole, under the specific distortion types, the method provided by the present invention has the best performance, and the FI-UQI method is the second best. Moreover, on the LIVE II stereoscopic image database, the method provided by the present invention has the assessment performance better than the other image quality assessment methods; and, on the LIVE I and NBU stereoscopic image database, although the method provided by the present invention is not the best, but is the intermediate.

TABLE 1 values of three predictive performance indexes, respectively SROCC, PLCC and RMSE, of method provided by present invention, FI-PSNR method, FI-SSIM method, FI-MS-SSIM method, FI-VIF method, and FI-UQI method on three stereoscopic image databases

| Image quality objective assessment method | NBU stereoscopic image database (312 distorted stereoscopic images) | | | LIVE I stereoscopic image database (365 distorted stereoscopic images) | | | LIVE II stereoscopic image database (360 distorted stereoscopic images) | | |
|---|---|---|---|---|---|---|---|---|---|
| | PLCC | SROCC | RMSE | PLCC | SROCC | RMSE | PLCC | SROCC | RMSE |
| FI-PSNR | 0.9077 | 0.8889 | 7.2081 | 0.8645 | 0.8559 | 8.2424 | 0.6584 | 0.6375 | 8.4956 |
| FI-SSIM | 0.9143 | 0.9093 | 6.9565 | 0.8699 | 0.8606 | 8.0874 | 0.6844 | 0.6795 | 8.2295 |
| FI-MS-SSIM | 0.8936 | 0.8963 | 7.7116 | 0.8825 | 0.8949 | 7.7104 | 0.7279 | 0.7244 | 7.7400 |
| FI-VIF | 0.8455 | 0.8463 | 9.1739 | 0.9222 | 0.9188 | 6.3423 | 0.7234 | 0.7213 | 7.7936 |
| FI-UQI | 0.7142 | 0.7086 | 12.0224 | 0.8996 | 0.9022 | 7.1619 | 0.7775 | 0.7720 | 7.0990 |
| Method of present invention | 0.9111 | 0.9155 | 7.0799 | 0.9453 | 0.9380 | 5.3484 | 0.9271 | 0.9250 | 4.2317 |

TABLE 2 values of predictive performance index PLCC of method provided by present invention, FI-PSNR method, FI-SSIM method, FI-MS-SSIM method, FI-VIF method, and FI-UQI method on fifteen specific groups of distortion sub-databases in three stereoscopic image databases

| | distortion types | FI-PSNR | FI-SSIM | FI-MS-SSIM | FI-VIF | FI-UQI | Method of present invention |
|---|---|---|---|---|---|---|---|
| NBU stereoscopic image database | JPEG | 0.9433 | 0.9420 | 0.9274 | 0.9467 | 0.7161 | 0.8946 |
| | JP2K | 0.9402 | 0.9441 | 0.9355 | 0.9259 | 0.6858 | 0.8366 |
| | WN | 0.9158 | 0.9302 | 0.9392 | 0.9551 | 0.7897 | 0.9188 |
| | Gblur | 0.9596 | 0.9578 | 0.9537 | 0.9696 | 0.9611 | 0.9483 |
| | H264 | 0.9640 | 0.9665 | 0.9722 | 0.9696 | 0.9611 | 0.9330 |
| LIVE I stereoscopic image database | JPEG | 0.2866 | 0.2741 | 0.5776 | 0.6545 | 0.7764 | 0.6975 |
| | JP2K | 0.8381 | 0.8210 | 0.9207 | 0.9412 | 0.9532 | 0.9397 |
| | WN | 0.9280 | 0.9250 | 0.9037 | 0.9310 | 0.9374 | 0.9510 |
| | Gblur | 0.9475 | 0.9080 | 0.9368 | 0.9573 | 0.9633 | 0.9577 |
| | FF | 0.7086 | 0.7297 | 0.7036 | 0.7572 | 0.7752 | 0.8608 |
| LIVE II stereoscopic image database | JPEG | 0.6124 | 0.5486 | 0.8656 | 0.8906 | 0.8220 | 0.8706 |
| | JP2K | 0.7457 | 0.7191 | 0.8668 | 0.9164 | 0.8279 | 0.8466 |
| | WN | 0.9150 | 0.9139 | 0.9406 | 0.8981 | 0.8667 | 0.9574 |
| | Gblur | 0.7083 | 0.7250 | 0.7056 | 0.8993 | 0.8079 | 0.9851 |
| | FF | 0.7025 | 0.7342 | 0.7201 | 0.7574 | 0.7233 | 0.9585 |

TABLE 3 values of predictive performance index SROCC of method provided by present invention, FI-PSNR method, FI-SSIM method, FI-MS-SSIM method, FI-VIF method, and FI-UQI method on fifteen specific groups of distortion sub-databases in three stereoscopic image databases

| | distortion types | FI-PSNR | FI-SSIM | FI-MS-SSIM | FI-VIF | FI-UQI | Method of present invention |
|---|---|---|---|---|---|---|---|
| NBU stereoscopic image database | JPEG | 0.9390 | 0.9456 | 0.9389 | 0.9514 | 0.7673 | 0.9300 |
| | JP2K | 0.9469 | 0.9439 | 0.9468 | 0.9282 | 0.7357 | 0.9184 |
| | WN | 0.8604 | 0.9163 | 0.8977 | 0.9233 | 0.7112 | 0.8621 |
| | Gblur | 0.9526 | 0.9692 | 0.9713 | 0.9737 | 0.9652 | 0.9523 |
| | H264 | 0.9555 | 0.9536 | 0.9590 | 0.9513 | 0.7911 | 0.9351 |
| LIVE I stereoscopic image database | JPEG | 0.2070 | 0.2407 | 0.5614 | 0.6002 | 0.7498 | 0.6628 |
| | JP2K | 0.8388 | 0.8222 | 0.8979 | 0.9125 | 0.9344 | 0.9020 |
| | WN | 0.9284 | 0.9282 | 0.9227 | 0.9335 | 0.9417 | 0.9515 |
| | Gblur | 0.9345 | 0.8788 | 0.9340 | 0.9329 | 0.9377 | 0.9349 |
| | FF | 0.6581 | 0.6866 | 0.6940 | 0.7497 | 0.7456 | 0.8099 |
| LIVE II | JPEG | 0.6129 | 0.5644 | 0.8631 | 0.8768 | 0.7844 | 0.8484 |

TABLE 3-continued values of predictive performance index SROCC of method provided by
present invention, FI-PSNR method, FI-SSIM method, FI-MS-SSIM method,
FI-VIF method, and FI-UQI method on fifteen specific groups of distortion
sub-databases in three stereoscopic image databases

| | distortion types | FI-PSNR | FI-SSIM | FI-MS-SSIM | FI-VIF | FI-UQI | Method of present invention |
|---|---|---|---|---|---|---|---|
| stereoscopic image database | JP2K | 0.7193 | 0.7003 | 0.8524 | 0.9212 | 0.8318 | 0.8547 |
| | WN | 0.9073 | 0.9091 | 0.9402 | 0.9341 | 0.8857 | 0.9529 |
| | Gblur | 0.7112 | 0.7387 | 0.7483 | 0.8868 | 0.8411 | 0.9370 |
| | FF | 0.7012 | 0.7350 | 0.6979 | 0.7586 | 0.7152 | 0.9528 |

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An objective assessment method for a stereoscopic image quality combined with manifold characteristics and binocular characteristics, comprising steps of:

① selecting multiple undistorted natural scene plane images, and extracting a luminance component from each undistorted natural scene plane image;

then, dividing the luminance component of each undistorted natural scene plane image into image blocks which are not overlapping mutually and have a size of 8×8;

next, randomly selecting N image blocks from all the image blocks of the luminance components of all the undistorted natural scene plane images; adopting each selected image block as a training sample; and denoting an $i^{th}$ training sample as $x_i$; wherein: $5000 \leq N \leq 20000$, and $1 \leq i \leq N$;

subsequently, forming a gray vector through arranging pixel values of all pixels in each training sample; and denoting a gray vector formed through arranging pixel values of all pixels in the $x_i$ as $x_i^{col}$, wherein: the $x_i^{col}$ has a dimensionality of 64×1; and, a value of a $1^{st}$ element to a $64^{th}$ element in the $x_i^{col}$ respectively correspond to the pixel value of each pixel in the $x_i$ in a line-by-line scanning manner;

afterwards, for each gray vector corresponding to each training sample, subtracting a mean value of values of all elements in the gray vector from a value of each element in the gray vector, so as to centralize the gray vector corresponding to each training sample; and denoting a gray vector obtained after centralizing the $x_i^{col}$ as $\hat{x}_i^{col}$; and finally, denoting a matrix formed by all obtained centralized gray vectors as X, $X=[\hat{x}_1^{col}, \hat{x}_2^{col}, \ldots, \hat{x}_N^{col}]$, wherein: the X has a dimensionality of 64×N; the $\hat{x}_1^{col}, \hat{x}_2^{col}, \ldots, \hat{x}_N^{col}$ respectively represent a gray vector obtained after centralizing a gray vector formed through arranging pixel values of all pixels in a $1^{st}$ training sample, a gray vector obtained after centralizing a gray vector formed through arranging pixel values of all pixels in a $2^{nd}$ training sample, ..., and a gray vector obtained after centralizing a gray vector formed through arranging pixel values of all pixels in an $N^{th}$ training sample; and a symbol "[ ]" is a vector representation symbol;

② processing the X with dimensionality reduction and whitening through a principal component analysis, and denoting an obtained matrix after the dimensionality reduction and whitening as $X^W$, wherein: the $X^W$ has a dimensionality of M×N; and the M is a set low dimensionality, $1 < M < 64$;

③ training N column vectors in the $X^W$ through an orthogonal locality preserving projection algorithm, and obtaining a best mapping matrix of eight orthogonal bases of the $X^W$, denoted as $J^W$, wherein the $J^W$ has a dimensionality of 8×M; and then, according to the $J^W$ and a whitened matrix, calculating a best mapping matrix of an original sample space, denoted as J, $J=J^W \times W$, wherein: the J has a dimensionality of 8×64; the W represents the whitened matrix; and the W has a dimensionality of M×64;

④ representing an original undistorted natural scene stereoscopic image having a width of W' and a height of H' by $I_{org}$; respectively denoting a left viewpoint image and a right viewpoint image of the $I_{org}$ as $I_{org}^L$ and $I_{org}^R$, and extracting luminance components respectively from the $I_{org}^L$ and the $I_{org}^R$; representing a distorted stereoscopic image of the $I_{org}$ after distortion by $I_{dis}$; adopting the $I_{dis}$ as a distorted stereoscopic image to be assessed; respectively denoting a left viewpoint image and a right viewpoint image of the $I_{dis}$ as $I_{dis}^L$ and $I_{dis}^R$, and extracting luminance components respectively from the $I_{dis}^L$ and the $I_{dis}^R$;

then, dividing the luminance components of the $I_{org}^L$, the $I_{org}^R$, the $I_{dis}^L$, and the $I_{dis}^R$ respectively into $\left\lfloor \frac{W'}{8} \right\rfloor \times \left\lfloor \frac{H'}{8} \right\rfloor$ image blocks which are not overlapping mutually and have a size of 8×8; denoting a $j^{th}$ image block in the luminance component of the $I_{org}^L$ as $x_j^{ref,L}$; denoting a $j^{th}$ image block in the luminance component of the $I_{org}^R$ as $x_j^{ref,R}$; denoting a $j^{th}$ image block in the luminance component of the $I_{dis}^L$ as $x_j^{dis,L}$; and denoting a $j^{th}$ image block in the luminance component of the $I_{dis}^R$ as $x_j^{dis,R}$; wherein a symbol "⌊ ⌋" is a floor symbol; $1 \leq j \leq N'$; and $$N' = \left\lfloor \frac{W'}{8} \right\rfloor \times \left\lfloor \frac{H'}{8} \right\rfloor;$$

next, forming a gray vector through arranging pixel values of all pixels in each image block of the luminance component of the $I_{org}^L$, and denoting a gray vector formed through arranging pixel values of all pixels in the $x_j^{ref,L}$ as $x_j^{ref,L,col}$; forming a gray vector through arranging pixel values of all pixels in each image block of the luminance component of the $I_{org}^R$, and denoting a gray vector formed through arranging pixel values of all pixels in the $x_j^{ref,R}$ as $x_j^{ref,R,col}$; forming a gray vector through arranging pixel values of all pixels in each image block of the luminance component of the $I_{dis}^L$, and denoting a gray vector formed through arranging pixel values of all pixels in the $x_j^{dis,L}$ as $x_j^{dis,L,col}$; forming a gray vector through arranging pixel values of all pixels in each image block of the luminance component of the $I_{dis}^R$, and denoting a gray vector formed through arranging pixel values of all pixels in the $x_j^{dis,R}$ as $x_j^{dis,R,col}$; wherein: the $x_j^{ref,L,col}$, the $x_j^{ref,R,col}$, the $x_j^{dis,L,col}$, and the $x_j^{dis,R,col}$ all have a dimensionality of 64×1; a value of a $1^{st}$ element to a $64^{th}$ element in the $x_j^{ref,L,col}$ respectively correspond to the pixel value of each pixel in the $x_j^{ref,L}$ in the line-by-line scanning manner; a value of a $1^{st}$ element to a $64^{th}$ element in the $x_j^{ref,R,col}$ respectively correspond to the pixel value of each pixel in the $x_j^{ref,R}$ in the line-by-line scanning manner; a value of $1^{st}$ element to a $64^{th}$ element in the $x_j^{dis,L,col}$ respectively correspond to the pixel value of each pixel in the $x_j^{dis,L}$ in the line-by-line scanning manner; and, a value of a $1^{st}$ element to a $64^{th}$ element in the $x_j^{dis,R,col}$ respectively correspond to the pixel value of each pixel in the $x_j^{dis,R}$ in the line-by-line scanning manner;

afterwards, for each gray vector corresponding to each image block of the luminance component of the $I_{org}^L$, subtracting a mean value of values of all elements in the gray vector from a value of each element in the gray vector, so as to centralize the gray vector corresponding to each image block of the luminance component of the $I_{org}^L$, and denoting a gray vector obtained after centralizing the $x_j^{ref,L,col}$ as $\hat{x}_j^{ref,L,col}$; for each gray vector corresponding to each image block of the luminance component of the $I_{org}^R$, subtracting a mean value of values of all elements in the gray vector from a value of each element in the gray vector, so as to centralize the gray vector corresponding to each image block of the luminance component of the $I_{org}^R$, and denoting a gray vector obtained after centralizing the $x_j^{ref,R,col}$ as $\hat{x}_j^{ref,R,col}$; for each gray vector corresponding to each image block of the luminance component of the $I_{dis}^L$, subtracting a mean value of values of all elements in the gray vector from a value of each element in the gray vector, so as to centralize the gray vector corresponding to each image block of the luminance component of the $I_{dis}^L$, and denoting a gray vector obtained after centralizing the $x_j^{dis,L,col}$ as $\hat{x}_j^{dis,L,col}$; for each gray vector corresponding to each image block of the luminance component of the $I_{dis}^R$, subtracting a mean value of values of all elements in the gray vector from a value of each element in the gray vector, so as to centralize the gray vector corresponding to each image block of the luminance component of the $I_{dis}^R$, and denoting a gray vector obtained after centralizing the $x_j^{dis,R,col}$ as $\hat{x}_j^{dis,R,col}$; and finally, denoting a matrix formed by all obtained centralized gray vectors corresponding to the luminance component of the $I_{org}^L$ as $X^{ref,L}$, $X^{ref,L}=[\hat{x}_1^{ref,L,col}, \hat{x}_2^{ref,L,col}, \ldots, \hat{x}_{N'}^{ref,L,col}]$; denoting a matrix formed by all obtained centralized gray vectors corresponding to the luminance component of the $I_{org}^R$ as $X^{ref,R}$, $X^{ref,R}=[\hat{x}_1^{ref,R,col}, \hat{x}_2^{ref,R,col}, \ldots, \hat{x}_{N'}^{ref,R,col}]$; denoting a matrix formed by all obtained centralized gray vectors corresponding to the luminance component of the $I_{dis}^L$ as $X^{dis,L}$, $X^{dis,L}=[\hat{x}_1^{dis,L,col}, \hat{x}_2^{dis,L,col}, \ldots, \hat{x}_{N'}^{dis,L,col}]$; and, denoting a matrix formed by all obtained centralized gray vectors corresponding to the luminance component of the $I_{dis}^R$ as $X^{dis,R}$, $X^{dis,R}=[\hat{x}_1^{dis,R,col}, \hat{x}_2^{dis,R,col}, \ldots, \hat{x}_{N'}^{dis,R,col}]$; wherein the $X^{ref,L}$, the $X^{ref,R}$, the $X^{dis,L}$, and the $X^{dis,R}$ all have a dimensionality of 64×N'; the $\hat{x}_1^{ref,L,col}, \hat{x}_2^{ref,L,col}, \ldots, \hat{x}_{N'}^{ref,L,col}$ respectively represent a gray vector obtained after centralizing a gray vector formed through arranging pixel values of all pixels in a $1^{st}$ image block of the luminance component of the $I_{org}^L$, a gray vector obtained after centralizing a gray vector formed through arranging pixel values of all pixels in a $2^{nd}$ image block of the luminance component of the $I_{org}^L$, ..., and a gray vector obtained after centralizing a gray vector formed through arranging pixel values of all pixels in an $N'^{th}$ image block of the luminance component of the $I_{org}^L$; the $\hat{x}_1^{ref,R,col}, \hat{x}_2^{ref,R,col}, \ldots, \hat{x}_{N'}^{ref,R,col}$ respectively represent a gray vector obtained after centralizing a gray vector formed through arranging pixel values of all pixels in a $1^{st}$ image block of the luminance component of the $I_{org}^R$, a gray vector obtained after centralizing a gray vector formed through arranging pixel values of all pixels in a $2^{nd}$ image block of the luminance component of the $I_{org}^R$, ..., and a gray vector obtained after centralizing a gray vector formed through arranging pixel values of all pixels in an $N'^{th}$ image block of the luminance component of the $I_{org}^R$; the $\hat{x}_1^{dis,L,col}, \hat{x}_2^{dis,L,col}, \ldots, \hat{x}_{N'}^{dis,L,col}$ respectively represent a gray vector obtained after centralizing a gray vector formed through arranging pixel values of all pixels in a $1^{st}$ image block of the luminance component of the $I_{dis}^L$, a gray vector obtained after centralizing a gray vector formed through arranging pixel values of all pixels in a $2^{nd}$ image block of the luminance component of the $I_{dis}^L$, ..., and a gray vector obtained after centralizing a gray vector formed through arranging pixel values of all pixels in an $N'^{th}$ image block of the luminance component of the $I_{dis}^L$; the $\hat{x}_1^{dis,R,col}, \hat{x}_2^{dis,R,col}, \ldots, \hat{x}_{N'}^{dis,R,col}$ respectively represent a gray vector obtained after centralizing a gray vector formed through arranging pixel values of all pixels in a $1^{st}$ image block of the luminance component of the $I_{dis}^R$, ..., a gray vector obtained after centralizing a gray vector formed through arranging pixel values of all pixels in a $2^{nd}$ image block of the luminance component of the $I_{dis}^R$, ..., and a gray vector obtained after centralizing a gray vector formed through arranging pixel values of all pixels in an $N'^{th}$ image block of the luminance component of the $I_{dis}^R$; and the symbol "[ ]" is the vector representation symbol;

⑤ calculating a structural difference between each column vector in the $X^{ref,L}$ and a corresponding column vector in the $X^{dis,L}$, and denoting a structural difference between the $\hat{x}_j^{ref,L,col}$ and the $\hat{x}_j^{dis,L,col}$ as $AVE(\hat{x}_j^{ref,L,col}, \hat{x}_j^{dis,L,col})$; calculating a structural difference between each column vector in the $X^{ref,R}$ and a corresponding column vector in the $X^{dis,R}$, and denoting a structural difference between the $\hat{x}_j^{ref,R,col}$ and the $\hat{x}_j^{dis,R,col}$ as $AVE(\hat{x}_j^{ref,R,col}, \hat{x}_j^{dis,R,col})$;

then, forming a vector having a dimensionality of 1×N' through orderly arranging N' structural differences corresponding to the $X^{ref,L}$ and the $X^{dis,L}$, denoted as $v^L$; and, forming a vector having a dimensionality of 1×N' through orderly arranging N' structural differences corresponding to the $X^{ref,R}$ and the $X^{dis,R}$, denoted as $v^R$; wherein: a value of a $j^{th}$ element in the $v^L$ is $v_j^L$, $v_j^L = AVE(\hat{x}_j^{ref,L,col}, \hat{x}_j^{dis,L,col})$; and a value of a $j^{th}$ element in the $v^R$ is $v_j^R$, $v_j^R = AVE(\hat{x}_j^{ref,R,col}, \hat{x}_j^{dis,R,col})$; and obtaining an undistorted left viewpoint image block set, a distorted left viewpoint image block set, an undistorted right viewpoint image block set, and a distorted right viewpoint image block set, comprising steps of:

a1), setting a left viewpoint image block selection threshold $TH_1$ and a right viewpoint image block selection threshold $TH_2$;

a2), extracting all elements having a value larger than or equal to the $TH_1$ from the $v^L$, and extracting all elements having a value larger than or equal to the $TH_2$ from the $v^R$; and a3), adopting a set formed by the image blocks of the luminance component of the $I_{org}^L$ corresponding to the elements extracted from the $v^L$ as the undistorted left viewpoint image block set, denoted as $Y^{ref,L}$, $Y^{ref,L} = \{x_j^{ref,L} | AVE(\hat{x}_j^{ref,L,col}, \hat{x}_j^{dis,L,col}) \geq TH_1, 1 \leq j \leq N'\}$; adopting a set formed by the image blocks of the luminance component of the $I_{dis}^L$ corresponding to the elements extracted from the $v^L$ as the distorted left viewpoint image block set, denoted as $Y^{dis,L}$, $Y^{dis,L} = \{x_j^{dis,L} | AVE(\hat{x}_j^{ref,L,col}, \hat{x}_j^{dis,L,col}) \geq TH_1, 1 \leq j \leq N'\}$; adopting a set formed by the image blocks of the luminance component of the $I_{org}^R$ corresponding to the elements extracted from the $v^R$ as the undistorted right viewpoint image block set, denoted as $Y^{ref,R}$, $Y^{ref,R} = \{x_j^{ref,R} | AVE(\hat{x}_j^{ref,R,col}, \hat{x}_j^{dis,R,col}) \geq TH_2, 1 \leq j \leq N'\}$; and, adopting a set formed by the image blocks of the luminance component of the $I_{dis}^R$ corresponding to the elements extracted from the $v^R$ as the distorted right viewpoint image block set, denoted as $Y^{dis,R}$, $Y^{dis,R} = \{x_j^{dis,R} | AVE(\hat{x}_j^{ref,R,col}, \hat{x}_j^{dis,R,col}) \geq TH_2, 1 \leq j \leq N'\}$;

⑥ calculating a manifold characteristic vector of each image block in the $Y^{ref,L}$, and denoting a manifold characteristic vector of a $t^{th}$ image block in the $Y^{ref,L}$ as $r_t^{ref,L}$, $r_t^{ref,L} = J \times \hat{x}_t^{ref,L,col}$; calculating a manifold characteristic vector of each image block in the $Y^{dis,L}$, and denoting a manifold characteristic vector of a $t^{th}$ image block in the $Y^{dis,L}$ as $d_t^{dis,L}$, $d_t^{dis,L} = J \times \hat{x}_t^{dis,L,col}$; calculating a manifold characteristic vector of each image block in the $Y^{ref,R}$, and denoting a manifold characteristic vector of a $t'^{th}$ image block in the $Y^{ref,R}$ as $r_{t'}^{ref,R}$, $r_{t'}^{ref,R} = J \times \hat{x}_{t'}^{ref,R,col}$; calculating a manifold characteristic vector of each image block in the $Y^{dis,R}$, and denoting a manifold characteristic vector of a $t'^{th}$ image block in the $Y^{dis,R}$ as $d_{t'}^{dis,R}$, $d_{t'}^{dis,R} = J \times \hat{x}_{t'}^{dis,R,col}$; wherein: $1 \leq t \leq K$, the K represents a total number of the image blocks in the $Y^{ref,L}$, namely a total number of the image blocks in the $Y^{dis,L}$; $1 \leq t' \leq K'$, the K' represents a total number of the image blocks in the $Y^{ref,R}$, namely a total number of the image blocks in the $Y^{dis,R}$; the $r_t^{ref,L}$, the $d_t^{dis,L}$, the $r_{t'}^{ref,R}$, and the $d_{t'}^{dis,R}$ all have a dimensionality of 8×1; the $\hat{x}_t^{ref,L,col}$ represents a gray vector obtained after centralizing a gray vector formed through arranging pixel values of all pixels in the $t^{th}$ image block of the $Y^{ref,L}$; the $\hat{x}_t^{dis,L,col}$ represents a gray vector obtained after centralizing a gray vector formed through arranging pixel values of all pixels in the $t^{th}$ image block of the $Y^{dis,L}$; the $\hat{x}_{t'}^{ref,R,col}$ represents a gray vector obtained after centralizing a gray vector formed through arranging pixel values of all pixels in the $t'^{th}$ image block of the $Y^{ref,R}$; and, the $\hat{x}_{t'}^{dis,R,col}$ represents a gray vector obtained after centralizing a gray vector formed through arranging pixel values of all pixels in the $t'^{th}$ image block of the $Y^{dis,R}$;

then, forming a matrix by the manifold characteristic vectors of all the image blocks in the $Y^{ref,L}$, denoted as $R^L$; forming a matrix by the manifold characteristic vectors of all the image blocks in the $Y^{dis,L}$, denoted as $D^L$; forming a matrix by the manifold characteristic vectors of all the image blocks in the $Y^{ref,R}$, denoted as $R^R$; and, forming a matrix by the manifold characteristic vectors of all the image blocks in the $Y^{dis,R}$, denoted as $D^R$; wherein: the $R^L$ and the $D^L$ both have a dimensionality of 8×K; the $R^R$ and the $D^R$ both have a dimensionality of 8×K'; a $t^{th}$ column vector in the $R^L$ is the $r_t^{ref,L}$; a $t^{th}$ column vector in the $D^L$ is the $d_t^{dis,L}$; a $t'^{th}$ column vector in the $R^R$ is the $r_{t'}^{ref,R}$; and, a $t'^{th}$ column vector in the $D^R$ is the $d_{t'}^{dis,R}$; and calculating a manifold characteristic similarity between the luminance component of the $I_{org}^L$ and the luminance component of the $I_{dis}^L$, denoted as $MFS_1^L$, $$MFS_1^L = \frac{1}{8 \times K} \sum_{m=1}^{8} \sum_{t=1}^{K} \frac{2R_{m,t}^L D_{m,t}^L + C_1}{(R_{m,t}^L)^2 + (D_{m,t}^L)^2 + C_1};$$

and, calculating a manifold characteristic similarity between the luminance component of the $I_{org}^R$ and the luminance component of the $I_{dis}^R$, denoted as $MFS_1^R$, $$MFS_1^R = \frac{1}{8 \times K'} \sum_{m=1}^{8} \sum_{t'=1}^{K'} \frac{2R_{m,t'}^R D_{m,t'}^R + C_1}{(R_{m,t'}^R)^2 + (D_{m,t'}^R)^2 + C_1};$$

wherein: the $R_{m,t}^L$ represents a value of an element in a $m^{th}$ row and a $t^{th}$ column of the $R^L$; the $D_{m,t}^L$ represents a value of an element in a $m^{th}$ row and a $t^{th}$ column of the $D^L$; the $R_{m,t'}^R$ represents a value of an element in a $m^{th}$ row and a $t'^{th}$ column of the $R^R$; the $D_{m,t'}^R$ represents a value of an element in a $m^{th}$ row and a $t'^{th}$ column of the $D^R$; and, the $C_1$ is a small constant for guaranteeing a result stability;

⑦ calculating a luminance similarity between the luminance component of the $I_{org}^L$ and the luminance component of the $I_{dis}^L$, denoted as $MFS_2^L$, $$MFS_2^L = \frac{\sum_{t=1}^{K}(\mu_t^{ref,L} - \bar{\mu}^{ref,L}) \times (\mu_t^{dis,L} - \bar{\mu}^{dis,L}) + C_2}{\sqrt{\sum_{t=1}^{K}(\mu_t^{ref,L} - \bar{\mu}^{ref,L})^2 \times \sum_{t=1}^{K}(\mu_t^{dis,L} - \bar{\mu}^{dis,L})^2} + C_2};$$

and, calculating a luminance similarity between the luminance component of the $I_{org}^R$, and the luminance component of the $I_{dis}^R$, denoted as $MFS_2^R$, $$MFS_2^R = \frac{\sum_{t'=1}^{K'} \left(\mu_{t'}^{ref,R} - \overline{\mu}^{ref,R}\right) \times \left(\mu_{t'}^{dis,R} - \overline{\mu}^{dis,R}\right) + C_2}{\sqrt{\sum_{t'=1}^{K'} \left(\mu_{t'}^{ref,R} - \overline{\mu}^{ref,R}\right)^2 \times \sum_{t'=1}^{K'} \left(\mu_{t'}^{dis,R} - \overline{\mu}^{dis,R}\right)^2} + C_2};$$

wherein: the $\mu_t^{ref,L}$ represents a mean value of the pixel values of all the pixels in the $t^{th}$ image block of the $Y^{ref,L}$, $$\overline{\mu}^{ref,L} = \frac{\sum_{t=1}^{K} \mu_t^{ref,L}}{K};$$

the $\mu_t^{dis,L}$ represents a mean value of the pixel values of all the pixels in the $t^{th}$ image block of the $Y^{dis,L}$, $$\overline{\mu}^{dis,L} = \frac{\sum_{t=1}^{K} \mu_t^{dis,L}}{K};$$

the $\mu_{t'}^{ref,R}$ represents a mean value of the pixel values of all the pixels in the $t'^{th}$ image block of the $Y^{ref,R}$, $$\overline{\mu}^{ref,R} = \frac{\sum_{t'=1}^{K'} \mu_{t'}^{ref,R}}{K'};$$

the $\mu_{t'}^{dis,R}$ represents a mean value of the pixel values of all the pixels in the $t'^{th}$ image block of the $Y^{dis,R}$, $$\overline{\mu}^{dis,R} = \frac{\sum_{t'=1}^{K'} \mu_{t'}^{dis,R}}{K'};$$

and, the $C_2$ is a small constant for guaranteeing a result stability;

⑧ processing the $MFS_1^L$ and the $MFS_2^L$ with power exponent weighting, so as to obtain a quality score of the $I_{dis}^L$, denoted as $MFS^L$, $MFS^L = (MFS_1^L)^\alpha \times (MFS_2^L)^\beta$; and, processing the $MFS_1^R$ and the $MFS_2^R$ with the power exponent weighting, so as to obtain a quality score of the $I_{dis}^R$, denoted as $MFS^R$, $MFS^R = (MFS_1^R)^\alpha \times (MFS_2^R)^\beta$; wherein: the $\alpha$ is for adjusting a relative importance of the $MFS_1^L$ and the $MFS_1^R$; the $\beta$ is for adjusting a relative importance of the $MFS_2^L$ and the $MFS_2^R$; and, $\alpha + \beta = 1$; and ⑨ obtaining a weighted value of the $I_{dis}^L$ and a weighted value of the $I_{dis}^R$ through a binocular rivalry model, respectively denoted as $\omega^L$ and $\omega^R$; weighting the $MFS^L$ through the $\omega^L$, and weighting the $MFS^R$ through the $\omega^R$, so as to obtain a quality value of the $I_{dis}$, denoted as Q, $Q = \omega^L \times MFS^L + \omega^R \times MFS^R$; wherein: the $\omega^L$ is for adjusting a relative importance of the $MFS^L$; the $\omega^R$ is for adjusting a relative importance of the $MFS^R$; and, $\omega^L + \omega^2 = 1$.

2. The objective assessment method for the stereoscopic image quality combined with the manifold characteristics and the binocular characteristics, as recited in claim 1, wherein the $X^W$ in the step ② is obtained through following steps of:

②-1, calculating a covariance matrix of the X, denoted as C, $$C = \frac{1}{N}(X \times X^T),$$

wherein: the C has a dimensionality of 64×64; and, the $X^T$ is a transposed matrix of the X;

②-2, processing the C with eigenvalue decomposition, and decomposing the C into an eigenvalue diagonal matrix and an eigenvector matrix, respectively denoted as ψ and E, wherein: the ψ has a dimensionality of 64×64, $$\Psi = \begin{bmatrix} \Psi_1 & 0 & \ldots & 0 \\ 0 & \Psi_2 & \ldots & 0 \\ \ldots & \ldots & \ldots & \ldots \\ 0 & 0 & 0 & \Psi_{64} \end{bmatrix};$$

the $\psi_1$, the $\psi_2$, and the $\psi_{64}$ respectively represent a $1^{st}$ eigenvalue, a $2^{nd}$ eigenvalue, and a $64^{th}$ eigenvalue obtained through decomposing; the E has a dimensionality of 64×64, $E = [e_1 \ e_2 \ \ldots \ e_{64}]$; the $e_1$, the $e_2$, and the $e_{64}$ respectively represent a $1^{st}$ eigenvector, a $2^{nd}$ eigenvector, and a $64^{th}$ eigenvector obtained through decomposing; and, the $e_1$, the $e_2$, and the $e_{64}$ all have a dimensionality of 64×1;

②-3, calculating the whitened matrix, denoted as the W, $$W = \Psi_{M \times 64}^{-\frac{1}{2}} \times E^T,$$

wherein: the W has the dimensionality of M×64;

$$\Psi_{M \times 64}^{-\frac{1}{2}} = \begin{bmatrix} 1/\sqrt{\Psi_1} & 0 & \ldots & 0 & \ldots & 0 \\ 0 & 1/\sqrt{\Psi_2} & \ldots & 0 & \ldots & 0 \\ \ldots & \ldots & \ldots & \ldots & \ldots & \ldots \\ 0 & 0 & \ldots & 1/\sqrt{\Psi_M} & \ldots & 0 \end{bmatrix};$$

the $\psi_M$ represents an $M^{th}$ eigenvalue obtained through decomposing; the M is the set low dimensionality, 1<M<64; and, the $E^T$ is a transposed matrix of the E; and ②-4, calculating the matrix $X^W$ obtained after the dimensionality reduction and whitening, wherein $X^W = W \times X$.

3. The objective assessment method for the stereoscopic image quality combined with the manifold characteristics and the binocular characteristics, as recited in claim 1, wherein: in the step ⑤, $$AVE\left(\hat{x}_j^{ref,L,col}, \hat{x}_j^{dis,L,col}\right) = \left| \sum_{g=1}^{64} \left(\hat{x}_j^{ref,L,col}(g)\right)^2 - \sum_{g=1}^{64} \left(\hat{x}_j^{dis,L,col}(g)\right)^2 \right|,$$

and $$AVE(\hat{x}_j^{ref,R,col}, \hat{x}_j^{dis,R,col}) = \left|\sum_{g=1}^{64}(\hat{x}_j^{ref,R,col}(g))^2 - \sum_{g=1}^{64}(\hat{x}_j^{dis,R,col}(g))^2\right|;$$

a symbol "||" is an absolute value symbol; the $\hat{x}_j^{ref,L,col}$ (g) represents a value of a $g^{th}$ element in the $\hat{x}_j^{ref,L,col}$; the $\hat{x}_j^{dis,L,col}$ (g) represents a value of a $g^{th}$ element in the $\hat{x}_j^{dis,L,col}$; the $\hat{x}_j^{ref,R,col}$ (g) represents a value of a $g^{th}$ element in the $\hat{x}_j^{ref,R,col}$; and, the $\hat{x}_j^{dis,R,col}$ (g) represents a value of a $g^{th}$ element in the $\hat{x}_j^{dis,R,col}$.

4. The objective assessment method for the stereoscopic image quality combined with the manifold characteristics and the binocular characteristics, as recited in claim 2, wherein: in the step ⑤, $$AVE(\hat{x}_j^{ref,L,col}, \hat{x}_j^{dis,L,col}) = \left|\sum_{g=1}^{64}(\hat{x}_j^{ref,L,col}(g))^2 - \sum_{g=1}^{64}(\hat{x}_j^{dis,L,col}(g))^2\right|,$$

and $$AVE(\hat{x}_j^{ref,R,col}, \hat{x}_j^{dis,R,col}) = \left|\sum_{g=1}^{64}(\hat{x}_j^{ref,R,col}(g))^2 - \sum_{g=1}^{64}(\hat{x}_j^{dis,R,col}(g))^2\right|;$$

a symbol "| |" is an absolute value symbol; the $\hat{x}_j^{ref,L,col}$ (g) represents a value of a $g^{th}$ element in the $\hat{x}_j^{ref,L,col}$; the $\hat{x}_j^{dis,L,col}$ (g) represents a value of a $g^{th}$ element in the $\hat{x}_j^{dis,L,col}$; the $\hat{x}_j^{ref,R,col}$ (g) represents a value of a $g^{th}$ element in the $\hat{x}_j^{ref,R,col}$; and, the $\hat{x}_j^{dis,R,col}$ (g) represents a value of a $g^{th}$ element in the $\hat{x}_j^{dis,R,col}$.

5. The objective assessment method for the stereoscopic image quality combined with the manifold characteristics and the binocular characteristics, as recited in claim 3, wherein: in the step a1) of the step ⑤, $TH_1$=median($v^L$), and $TH_2$=median($v^R$); the median( ) is a mid-value selection function; the median($v^L$) is to find a mid-value of values of all elements in the $v^L$; and the median($v^R$) is to find a mid-value of values of all elements in the $v^R$.

6. The objective assessment method for the stereoscopic image quality combined with the manifold characteristics and the binocular characteristics, as recited in claim 4, wherein: in the step a1) of the step ⑤, $TH_1$=median($v^L$), and $TH_2$=median($v^R$); the median( ) is a mid-value selection function; the median($v^L$) is to find a mid-value of values of all elements in the $v^L$; and the median($v^R$) is to find a mid-value of values of all elements in the $v^R$.

7. The objective assessment method for the stereoscopic image quality combined with the manifold characteristics and the binocular characteristics, as recited in claim 1, wherein the $\omega^L$ and the $\omega^R$ in the step ⑨ are obtained through following steps of:

⑨-1, sliding in the $I_{org}^L$ pixel by pixel with a sliding window having a size of Q×Q, dividing the $$I_{org}^L \text{ into } \left(W' - \frac{Q-1}{2}\right) \times \left(H' - \frac{Q-1}{2}\right)$$

image blocks which are overlapping and have a size of Q×Q, and denoting a $p^{th}$ image block in the $I_{org}^L$ as $B_p^{ref,L}$; sliding in the $I_{dis}^L$ pixel by pixel with the sliding window having the size of Q×Q, dividing the $$I_{dis}^L \text{ into } \left(W' - \frac{Q-1}{2}\right) \times \left(H' - \frac{Q-1}{2}\right)$$

image blocks which are overlapping and have a size of Q×Q, and denoting a $p^{th}$ image block in the $I_{dis}^L$ as $B_p^{dis,L}$; sliding in the $I_{org}^R$ pixel by pixel with the sliding window having the size of Q×Q, dividing the $$I_{org}^R \text{ into } \left(W' - \frac{Q-1}{2}\right) \times \left(H' - \frac{Q-1}{2}\right)$$

image blocks which are overlapping and have a size of Q×Q, and denoting a $p^{th}$ image block in the $I_{org}^R$ as $B_p^{ref,R}$; sliding in the $I_{dis}^R$ pixel by pixel with the sliding window having the size of Q×Q, dividing the $$I_{dis}^R \text{ into } \left(W' - \frac{Q-1}{2}\right) \times \left(H' - \frac{Q-1}{2}\right)$$

image blocks which are overlapping and have a size of Q×Q, and denoting a $p^{th}$ image block in the $I_{dis}^R$ as $B_p^{dis,R}$; wherein: 9≤Q≤37; the Q is an odd number; and $$1 \leq p \leq \left(W' - \frac{Q-1}{2}\right) \times \left(H' - \frac{Q-1}{2}\right);$$

⑨-2, adopting a Gaussian low-pass filtering function, and arranging a size of a required convolution mask to be Q×Q and a standard deviation to be ζ, so as to obtain a convolution mask, wherein 3≤ζ≤6; and, normalizing a value of each element in the convolution mask, so as to obtain a normalized convolution mask; wherein: a normalized value of each element in the convolution mask is obtained through dividing the value of each element in the convolution mask by a sum of values of all elements in the convolution mask;

⑨-3, through the normalized convolution mask, obtaining a weighted mean value of pixel values of all pixels in each image block of the $I_{org}^L$, and denoting a weighted mean value of pixel values of all pixels in the $B_p^{ref,L}$ as $\bar{b}_p^{ref,L}$, $$\bar{b}_p^{ref,L} = \frac{\sum_{u=1}^{Q}\sum_{v=1}^{Q}\text{Mode}(u,v) \times B_p^{ref,L}(u,v)}{Q \times Q};$$

through the normalized convolution mask, obtaining a weighted mean value of pixel values of all pixels in each image block of the $I_{dis}^L$, and denoting a weighted mean value of pixel values of all pixels in the $B_p^{dis,L}$ as $\bar{b}_p^{dis,L}$, $$\bar{b}_p^{dis,L} = \frac{\sum_{u=1}^{Q}\sum_{v=1}^{Q}\text{Mode}(u,v) \times B_p^{dis,L}(u,v)}{Q \times Q};$$

through the normalized convolution mask, obtaining a weighted mean value of pixel values of all pixels in each image block of the $I_{org}^L$, and denoting a weighted mean value of pixel values of all pixels in the $B_p^{ref,R}$ as $\bar{b}_p^{ref,R}$, $$\bar{b}_p^{ref,R} = \frac{\sum_{u=1}^{Q}\sum_{v=1}^{Q} \text{Mode}(u,v) \times B_p^{ref,R}(u,v)}{Q \times Q};$$

through the normalized convolution mask, obtaining a weighted mean value of pixel values of all pixels in each image block of the $I_{dis}^R$, and denoting a weighted mean value of pixel values of all pixels in the $B_p^{dis,R}$ as $\bar{b}_p^{dis,R}$, $$\bar{b}_p^{dis,R} = \frac{\sum_{u=1}^{Q}\sum_{v=1}^{Q} \text{Mode}(u,v) \times B_p^{dis,R}(u,v)}{Q \times Q};$$

wherein: $1 \leq u \leq Q$, $1 \leq v \leq Q$; the Mode(u, v) represents a value of an element having a subscript of (u, v) in the normalized convolution mask; the $B_p^{ref,L}(u,v)$ represents a pixel value of a pixel having coordinates of (u, v) in the $B_p^{ref,L}$; the $B_p^{dis,L}(u,v)$ represents a pixel value of a pixel having coordinates of (u, v) in the $B_p^{dis,L}$; the $B_p^{ref,R}(u,v)$ presents a pixel value of a pixel having coordinates of (u, v) in the $B_p^{ref,R}$; and, the $B_p^{dis,R}(u,v)$ represents a pixel value of a pixel having coordinates of (u, v) in the $B_p^{dis,R}$;

⑨-4, according to the weighted mean value of the pixel values of all the pixels in each image block of the $I_{org}^L$, calculating a variance of the pixel values of all the pixels in each image block of the $I_{org}^L$ to serve as a variance energy; according to the weighted mean value of the pixel values of all the pixels in each image block of the $I_{dis}^L$, calculating a variance of the pixel values of all the pixels in each image block of the $I_{dis}^L$ to serve as a variance energy; according to the weighted mean value of the pixel values of all the pixels in each image block of the $I_{org}^R$, calculating a variance of the pixel values of all the pixels in each image block of the $I_{org}^R$ to serve as a variance energy; and, according to the weighted mean value of the pixel values of all the pixels in each image block of the $I_{dis}^R$, calculating a variance of the pixel values of all the pixels in each image block of the $I_{dis}^R$ to serve as a variance energy;

⑨-5, according to the variance energy corresponding to each image block in the $I_{org}^L$, obtaining an energy diagram of the $I_{org}^L$, denoted as $E^{ref,L}$; according to the variance energy corresponding to each image block in the $I_{dis}^L$, obtaining an energy diagram of the $I_{dis}^L$, denoted as $E^{dis,L}$; according to the variance energy corresponding to each image block in the $I_{org}^R$, obtaining an energy diagram of the $I_{org}^R$, denoted as $E^{ref,R}$; and, according to the variance energy corresponding to each image block in the $I_{dis}^R$, obtaining an energy diagram of the $I_{dis}^R$, denoted as $E^{dis,R}$; wherein: the $E^{ref,L}$, the $E^{dis,L}$, the $E^{ref,R}$, and the $E^{dis,R}$ all have a width of $$W' - \frac{Q-1}{2}$$

and a height of $$H' - \frac{Q-1}{2};$$

a pixel value $E^{ref,L}(p)$ of a $p^{th}$ pixel in the $E^{ref,L}$ is equal to a variance energy corresponding to a $p^{th}$ image block in the $I_{org}^L$; a pixel value $E^{dis,L}(p)$ of a $p^{th}$ pixel in the $E^{dis,L}$ is equal to a variance energy corresponding to a $p^{th}$ image block in the $I_{dis}^L$; a pixel value $E^{ref,R}(p)$ of a $p^{th}$ pixel in the $E^{ref,R}$ is equal to a variance energy corresponding to a $p^{th}$ image block in the $I_{org}^R$; and, a pixel value $E^{dis,R}(p)$ of a $p^{th}$ pixel in the $E^{dis,R}$ is equal to a variance energy corresponding to a $p^{th}$ mage block in the $I_{dis}^R$;

⑨-6, calculating a local energy ratio diagram of the left viewpoint image, denoted as $\text{Ratio}^L$; denoting a pixel value of a $p^{th}$ pixel in the $\text{Ratio}^L$ as $\text{Ratio}^L(p)$, $$\text{Ratio}^L(p) = \frac{E^{dis,L}(p)}{E^{ref,L}(p)};$$

calculating a local energy ratio diagram of the right viewpoint image, denoted as $\text{Ratio}^R$; and, denoting a pixel value of a $p^{th}$ pixel in the $\text{Ratio}^R$ as $\text{Ratio}^R(p)$, $$\text{Ratio}^R(p) = \frac{E^{dis,R}(p)}{E^{ref,R}(p)};$$

wherein: the $\text{Ratio}^L$ and the $\text{Ratio}^R$ both have a width of $$W' - \frac{Q-1}{2}$$

and a height of $$H' - \frac{Q-1}{2};$$

and

⑨-7, calculating the $\omega^L$, $$\omega^L = \frac{(g^L)^2}{(g^L)^2 + (g^R)^2};$$

and, calculating the $\omega^R$, $$\omega^R = \frac{(g^R)^2}{(g^L)^2 + (g^R)^2};$$

wherein:

$$g^L = \frac{\sum_{p=1}^{\left(W'-\frac{Q-1}{2}\right)\times\left(H'-\frac{Q-1}{2}\right)} E^{dis,L}(p) \times \text{Ratio}^L(p)}{\sum_{p=1}^{\left(W'-\frac{Q-1}{2}\right)\times\left(H'-\frac{Q-1}{2}\right)} E^{dis,L}(p)};$$

and $$g^R = \frac{\sum_{p=1}^{\left(W'-\frac{Q-1}{2}\right)\times\left(H'-\frac{Q-1}{2}\right)} E^{dis,R}(p) \times Ratio^R(p)}{\sum_{p=1}^{\left(W'-\frac{Q-1}{2}\right)\times\left(H'-\frac{Q-1}{2}\right)} E^{dis,R}(p)}.$$

\* \* \* \* \*